US011623142B2

(12) United States Patent
Wang et al.

(10) Patent No.: US 11,623,142 B2
(45) Date of Patent: Apr. 11, 2023

(54) DATA PROCESSING METHOD AND MOBILE TERMINAL

(71) Applicant: TENCENT TECHNOLOGY (SHENZHEN) COMPANY LIMITED, Guangdong (CN)

(72) Inventors: Yiran Wang, Shenzhen (CN); Haosu Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 17/017,405

(22) Filed: Sep. 10, 2020

(65) Prior Publication Data

US 2020/0406135 A1   Dec. 31, 2020

Related U.S. Application Data

(63) Continuation of application No. 16/351,241, filed on Mar. 12, 2019, now Pat. No. 10,821,360, which is a
(Continued)

(30) Foreign Application Priority Data

| Dec. 6, 2016 | (CN) | 201611110485.5 |
| Dec. 6, 2016 | (CN) | 201611126230.8 |
| Dec. 22, 2016 | (CN) | 201611202118.8 |

(51) Int. Cl.
*A63F 13/42* (2014.01)
*A63F 13/2145* (2014.01)
(Continued)

(52) U.S. Cl.
CPC .......... *A63F 13/42* (2014.09); *A63F 13/2145* (2014.09); *A63F 13/5378* (2014.09);
(Continued)

(58) Field of Classification Search
CPC .. A63F 13/42; A63F 13/2145; A63F 13/5378; A63F 2300/1075;
(Continued)

(56) References Cited

U.S. PATENT DOCUMENTS

2006/0267955 A1   11/2006   Hino
2011/0055732 A1*   3/2011   Dawson ............. G06F 3/04815
715/757

FOREIGN PATENT DOCUMENTS

| CN | 102117179 A | 7/2011 |
| CN | 102142013 A | 8/2011 |

(Continued)

OTHER PUBLICATIONS

"Teleporting Script", https://forum.unity.com/threads/teleporting-script.106743/ (Year: 2011).*
(Continued)

*Primary Examiner* — James S. McClellan
*Assistant Examiner* — Ross A Williams
(74) *Attorney, Agent, or Firm* — ArentFox Schiff LLP

(57) ABSTRACT

Aspects of the disclosure provide a method for reducing operational complexity of mobile gaming. A scene switching instruction is received via an application interface. The application interface displays a first scene including a to-be-teleported operation object. The first scene displayed on the application interface is switched to a second scene according to the scene switching instruction. The second scene includes a target teleportation location object. A touch operation on the target teleportation location object in the second scene is received. In response to receiving the touch operation, a process of updating a coordinate of the to-be-teleported operation object to a coordinate of the target teleportation location object in the second scene is performed.

18 Claims, 25 Drawing Sheets

Related U.S. Application Data continuation of application No. PCT/CN2017/114610, filed on Dec. 5, 2017.

(51) Int. Cl.
  *A63F 13/5378* (2014.01)
  *G06F 3/04817* (2022.01)
  *G06F 3/0482* (2013.01)
  *G06F 3/04883* (2022.01)
  *G06F 3/0485* (2022.01)

(52) U.S. Cl.
  CPC .......... *G06F 3/0482* (2013.01); *G06F 3/0485* (2013.01); *G06F 3/04817* (2013.01); *G06F 3/04883* (2013.01); *A63F 2300/1075* (2013.01); *A63F 2300/307* (2013.01)

(58) Field of Classification Search
  CPC ............. A63F 2300/307; G06F 3/0482; G06F 3/0485; G06F 3/04883; G06F 3/04817
  See application file for complete search history.

(56) References Cited

FOREIGN PATENT DOCUMENTS

| CN | 102760205 A | 10/2012 |
|---|---|---|
| CN | 105597310 A | 12/2015 |
| CN | 105511763 A | 4/2016 |
| CN | 105607851 A | 5/2016 |
| CN | 105808303 A | 7/2016 |
| CN | 105159687 A | 12/2016 |
| CN | 106730819 A | 5/2017 |
| CN | 106774907 A | 5/2017 |

OTHER PUBLICATIONS

"Town Portal Scroll", Oct. 5, 2016, https://dota2.fandom.com/wiki/Town_Portal_Scroll?oldid=1316074 (Year: 2016).*
Written Opinion and International Search Report dated Mar. 7, 2018 in PCT/CN2017/114610 with concise English translation.
Chinese Office Application dated Mar. 22, 2018 in Chinese Application No. 201611202118.8 with partial English translation.
Xiatian Ge, Tutorial on camera movement in the game: Arena of Valor, Nov. 17, 2016 http://y.qq.com/x/page/x0346aa3hp6.html.
Arena of Valor Team, [New Year Revelation No. 3 by Daji Baby] Please check here for the great gaming experience, Jan. 13, 2016 http://pvp.qq.com/webplant/infor/news_version3/15592/24091/24092/24095/m15241/201601/423906.shtml.
Chinese Office Application dated Jun. 12, 2018 in Chinese Application No. 201611202118.8 with partial English translation.
Chinese Office Application dated Sep. 14, 2018 in Chinese Application No. 2016112021188 with partial English translation.
Chinese Office Application dated Mar. 28, 2018 in Chinese Application No. 201611126230.8 with partial English translation.
Mao et al, CN105511763A., English Machine Translation (Year: 2016).

* cited by examiner

DATA PROCESSING METHOD AND MOBILE TERMINAL

RELATED APPLICATION

This application is a continuation of U.S. patent application Ser. No. 16/351,241, "Data Processing Method and Mobile Terminal" filed on Mar. 12, 2019, which is a continuation of International Application No. PCT/CN2017/114610, filed on Dec. 5, 2017, which claims priority to Chinese Patent Application No. 201611126230.8, filed on Dec. 6, 2016 and entitled "DATA PROCESSING METHOD BASED ON MOBILE TERMINAL AND MOBILE TERMINAL", Chinese Patent Application No. 201611202118.8, filed on Dec. 22, 2016 and entitled "METHOD OF ADJUSTING VIEWABLE AREA OF VIRTUAL OBJECT IN VIRTUAL SCENE AND MOBILE TERMINAL", and Chinese Patent Application No. 201611110485.5, filed on Dec. 6, 2016 and entitled "OBJECT POSITION SWITCHING METHOD AND MOBILE TERMINAL" The entire disclosures of the prior applications are hereby incorporated by reference in their entirety.

FIELD OF THE TECHNOLOGY

The present disclosure relates to the field of Internet technologies.

BACKGROUND OF THE DISCLOSURE

With rapid development of the Internet, applications based on the Internet are increasing. As intelligent mobile terminals develop rapidly, various applications that are based on a personal computer (PC) in the past can now be used on a mobile terminal such as a mobile phone.

Because PCs have a relatively large screen and mobile terminals generally have a small screen, and one usually uses a mouse to perform an operation on an application on a PC but has to use a touch object such as a finger to control the cursor to operate a mobile terminal, operational complexity of a same application on a mobile terminal is higher than on a PC.

Especially, for applications that need to frequently interact with users, when being used on a mobile terminal, operational complexity of the applications is much higher. For example, if an operation object is moved by a user to another scene, the operation object can only be controlled to move as the scene moves and cannot be teleported to a scene position needing to be arrived at.

SUMMARY

Aspects of the disclosure provide a method for reducing operational complexity of mobile gaming. A scene switching instruction is received via an application interface. The application interface displays a first scene including a to-be-teleported operation object. The first scene displayed on the application interface is switched to a second scene according to the scene switching instruction. The second scene includes a target teleportation location object. A touch operation on the target teleportation location object in the second scene is received. In response to receiving the touch operation, a process of updating a coordinate of the to-be-teleported operation object to a coordinate of the target teleportation location object in the second scene is performed.

Aspects of the disclosure provide a non-transitory computer-readable medium storing a program. The program is executable by a processor to perform the method for reducing operational complexity of mobile gaming.

Aspects of the disclosure provide an apparatus for reducing operational complexity of mobile gaming. The apparatus includes circuitry configured to receive a scene switching instruction via an application interface. The application interface displays a first scene including a to-be-teleported operation object. The first scene displayed on the application interface is switched to a second scene according to the scene switching instruction. The second scene includes a target teleportation location object. A touch operation on the target teleportation location object is received in the second scene. In response to receiving the touch operation, a process of updating a coordinate of the to-be-teleported operation object to a coordinate of the target teleportation location object in the second scene is performed.

BRIEF DESCRIPTION OF THE DRAWINGS

To more clearly explain technical solutions in embodiments of the present disclosure, accompanying drawings needed in describing the embodiments are briefly introduced in the following. The following accompanying drawings are only some embodiments of the present disclosure, and a person skilled in the art can derive other accompanying drawings from the accompanying drawings.

DESCRIPTION OF EMBODIMENTS

Figure 1:
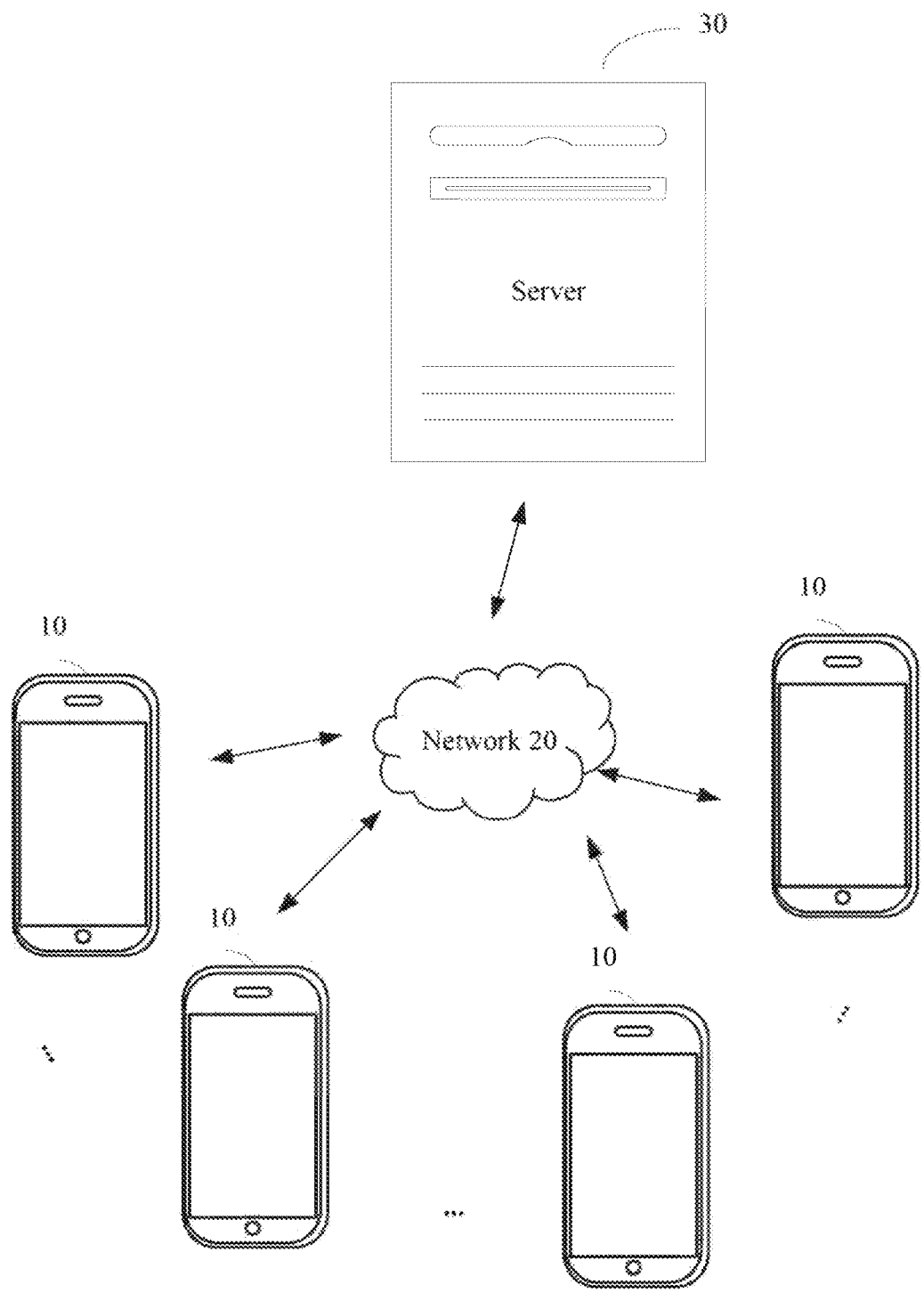
FIG. 1 is a schematic diagram of a data processing system according to an embodiment of the present disclosure.

The embodiments of the present disclosure provide a data processing method and a mobile terminal, used for reducing interaction operations, to reduce operational complexity on the mobile terminal.

The following describes the technical solutions in the embodiments of the present disclosure with reference to the accompanying drawings in the embodiments of the present disclosure. The described embodiments are merely some but not all of the embodiments of the present disclosure. In the specification, claims, and accompanying drawings of the present disclosure, the terms "first", "second", "third", "fourth", and so on (if existing) are intended to distinguish between similar objects rather than describe a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

With rapid development of the Internet, online battle arena games are increasingly popular to the public, and multiplayer online battle arena games (MOBA) are especially popular.

In a MOBA, players are generally divided into two teams. In this application, a team in which a player is in is referred to as a players team, and a team competing against the player is referred to as an enemy team. The MOBA provides a mock object for the player, and the mock object is represented as a "hero character" to the player. The player manipulates or controls the "hero character" selected by the player to compete against the enemy team.

The MOBA further provides resource objects for each player, and the player may utilize the resource objects to help the player fight. The resource objects generally include an organ, an eye, a soldier, and the like, and may include other objects.

The application of the existing MOBA used as a client game on a PC becomes increasingly mature. Because a screen of the PC is large, and a flexible and precise operation may be performed by using a mouse, or a keyboard, user experience of the MOBA on the PC is relatively intuitive and convenient. However, the PC has a large volume and a heavy mass, and is inconvenient to be carried, causing a relatively large limitation to times and occasions for a user to experience the MOBA.

As the mobile terminal such as a mobile phone develop rapidly, various MOBAs applicable to the PC can be operated on the mobile terminal as mobile games. The mobile terminal has a small volume and a light mass, and is portable and has convenience of connecting to a network, so that a player can experience fun brought by the MOBAs on a mobile terminal anytime. When a MOBA is played on a computer, a mouse can be used for operating. Because a screen of the computer is relatively large, and the mouse is flexible, a precise operation may usually be achieved when the MOBA is played on the computer. However, as the mobile terminal such as the mobile phone develops intellectually, many games can be operated on the mobile terminal, and the MOBA can also be operated on the mobile terminal. Because a screen of the mobile terminal is usually relatively small, and a screen of a touch screen usually needs to be operated by a finger, an operation is frequently caused to be imprecise, and operational complexity is relatively high.

To resolve problems that, when a MOBA is played on the mobile terminal, an operation is imprecise and operational complexity is high, an embodiment of the present disclosure provides a data processing system based on the mobile terminal. As shown in FIG. 1, the data processing system includes a plurality of mobile terminals 10, a network 20 and a server 30. The mobile terminals 10 and the server 30 are in a communication connection by using the network 20, each mobile terminal 10 is installed with a MOBA, and a user plays the MOBA online by using a mobile terminal 10 of the user with another user.

Because a mobile terminal game lacks a shortcut of a mouse operation, it becomes a difficult problem needing to be overcome of how to precisely comfortably simulate an experience sense of a client game on the mobile terminal game. For this, an embodiment of the present disclosure provides a teleportation manner based on a lens movement on a mobile terminal. When a user uses a function of moving a lens by using a mini-map or the right blank place of a screen, to move the lens to a corresponding object that can be teleported, the object in the lens can be directly clicked to be teleported. A capability of precise teleportation is achieved, so that a user may quickly perform the precise teleportation when observing a situation of a battlefield, and teleportation on the mobile terminal becomes a feasible, effective, and convenient play method.

Figure 2:
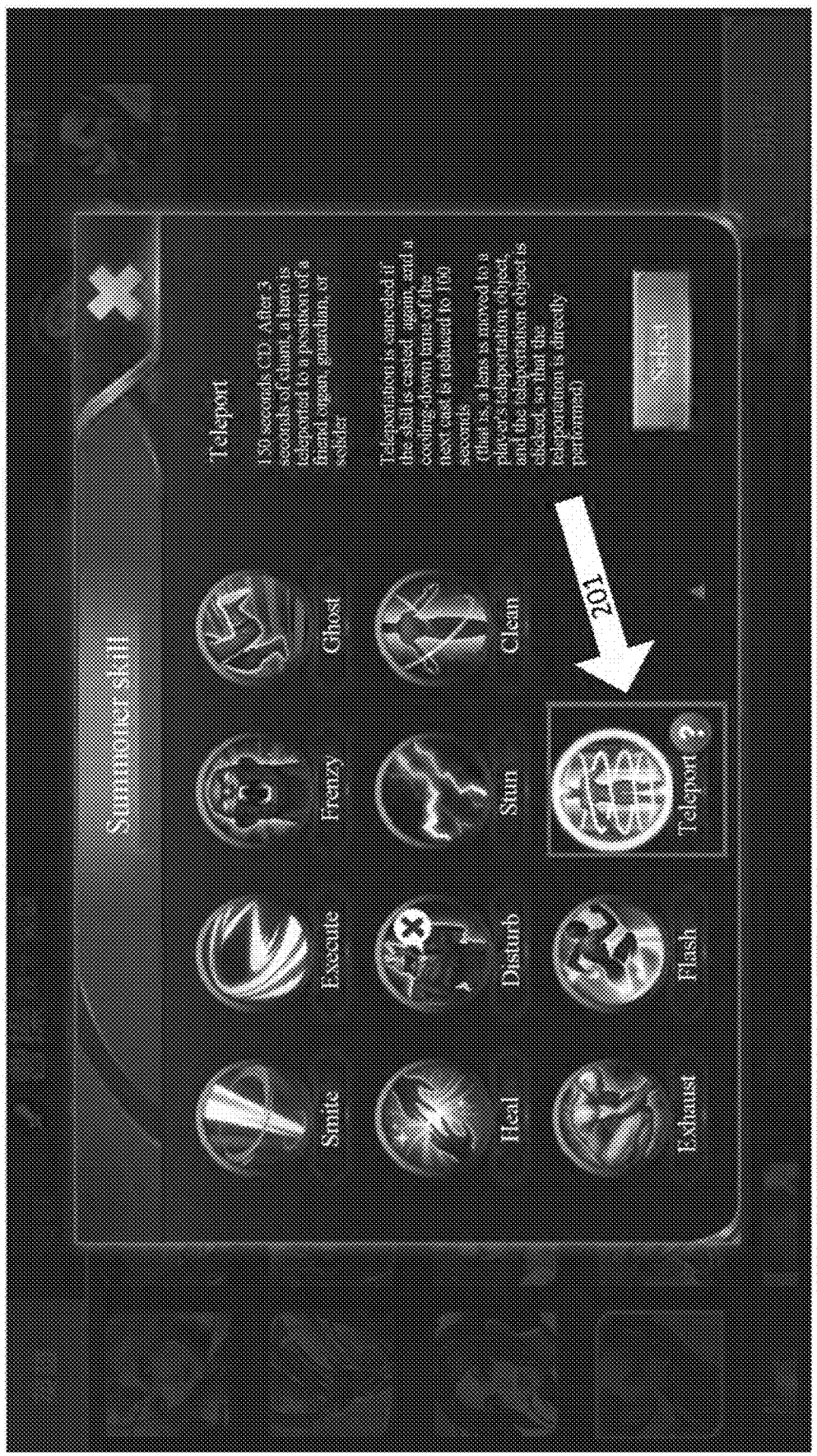
FIG. 2 is a schematic diagram of a scene of selecting a teleportation skill according to an embodiment of the present disclosure.

In this embodiment of the present disclosure, the mobile terminal may include but is not limited to an intelligent device having a data processing capability, such as a mobile phone, or a tablet computer. In this embodiment of the present disclosure, a lens configured for a MOBA game is image mapping of a mobile terminal screen. A user may slide the screen to move the lens, thereby moving an image scene displayed on the screen. The map refers to a thumbnail map of a whole game scene. The user may click a position on the map to trigger the lens to move, so that the screen of the mobile terminal displays the scene image corresponding to the clicked map. The teleportation refers to a process in which an original coordinate of an object manipulated by the user is updated to a target coordinate. The target coordinate can be determined using a coordinate of an organ, an eye, or a soldier disposed in the MOBA game as a reference. In this embodiment of the present disclosure, the teleportation is a skill of a character object (e.g., mock object, hero character). As shown in FIG. 2, on a character object selection interface, the user may select a teleportation skill (indicated by an arrow 201) for the character object, so that the selected character object has a teleportation skill.

Figure 3:
FIG. 3 is a schematic diagram of a scene of an application interface according to an embodiment of the present disclosure.

In this embodiment of the present disclosure, an application interface based on a mobile terminal may be a MOBA interface. For example, as shown in FIG. 3, a mini-map 100 is disposed on the application interface. The user may click a position on the mini-map by using a gesture instruction, so that a scene on the application interface is switched to a scene corresponding to the position clicked by the user. If a teleportation object that can be teleported exists in the switched scene, such as an organ 200 or an eye 300, or a soldier, the user clicks the teleportation object: the organ 200, or the eye 300, or the soldier, by using a gesture operation, so that the character object operated by the user can be teleported to a side of the organ 200, or a side of the eye 300, or a side of the soldier. That is, a coordinate of the character object are changed to a coordinate of the organ 200, or a coordinate of the 300, or a coordinate of the soldier.

Figure 4:
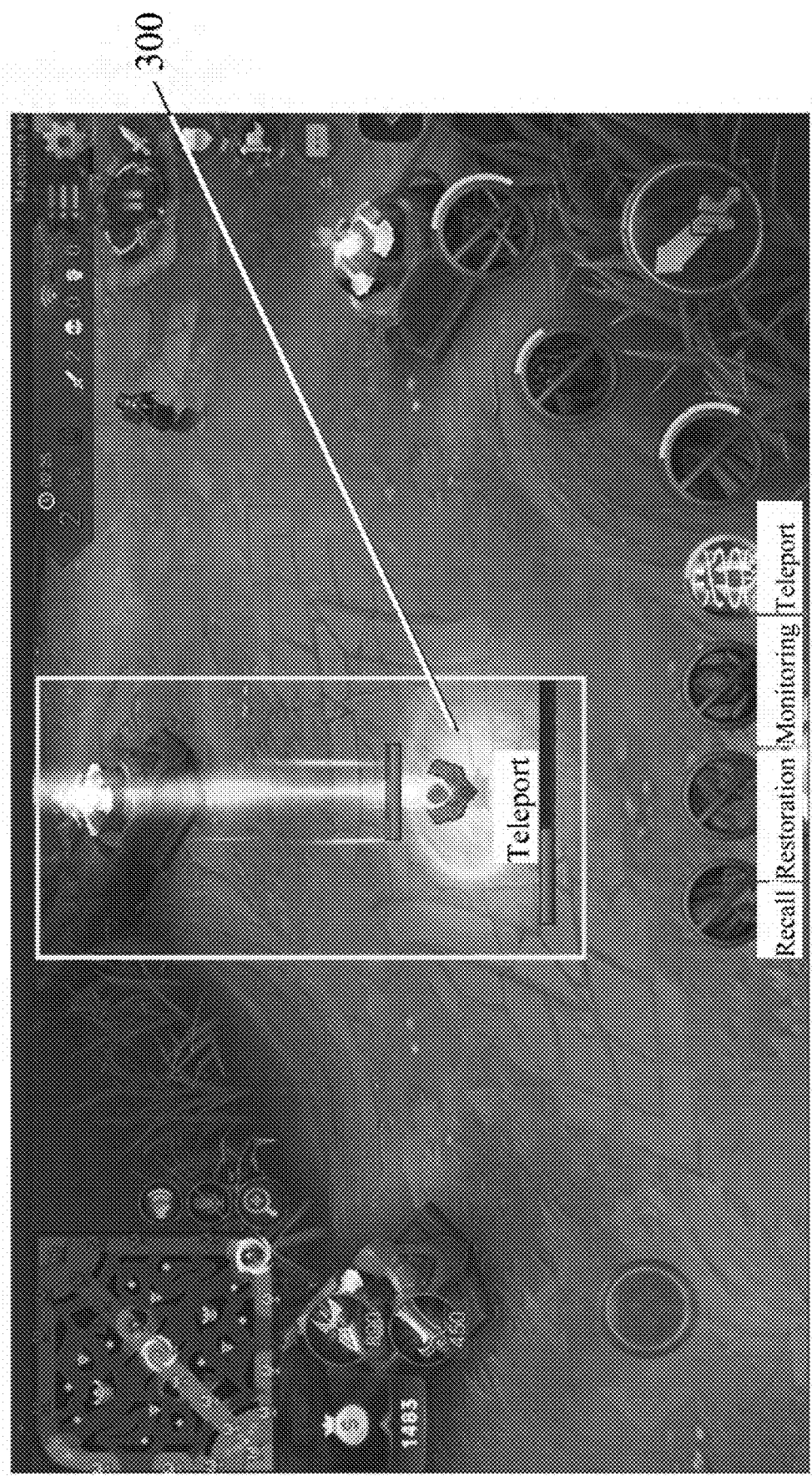
FIG. 4 is a schematic diagram of a scene of a teleportation process according to an embodiment of the present disclosure.
Figure 5:
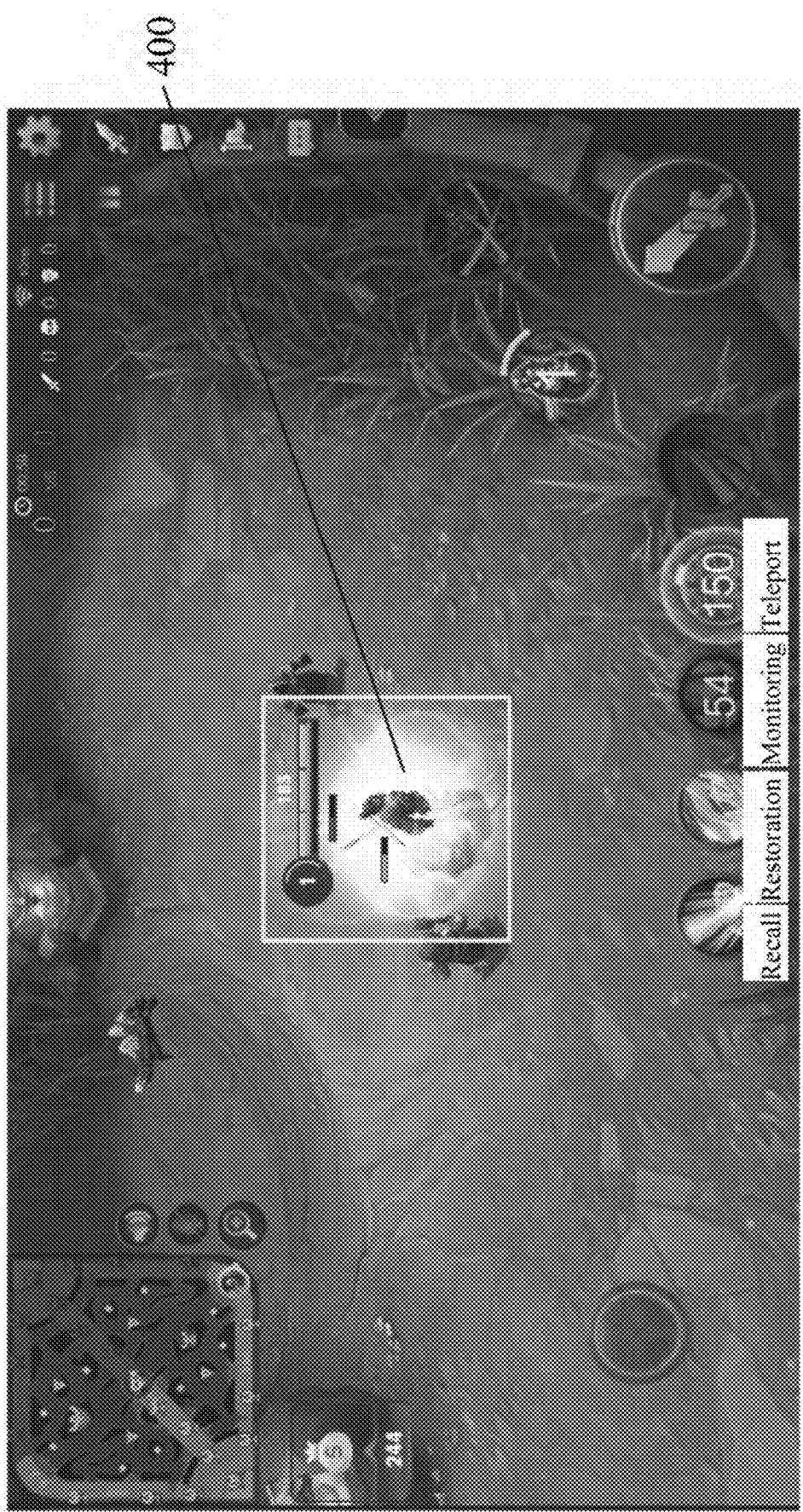
FIG. 5 is a schematic diagram of a scene in which teleportation ends according to an embodiment of the present disclosure.

FIG. 4 is a process of clicking the teleportation object eye 300 by the user to enable a teleportation function. The teleportation needs an interval of time that may be set as, for example, three seconds. After the user clicks the teleportation object eye 300, as shown in FIG. 5, a manipulated character object 400 is teleported to the position of the eye 300.

Figure 6:
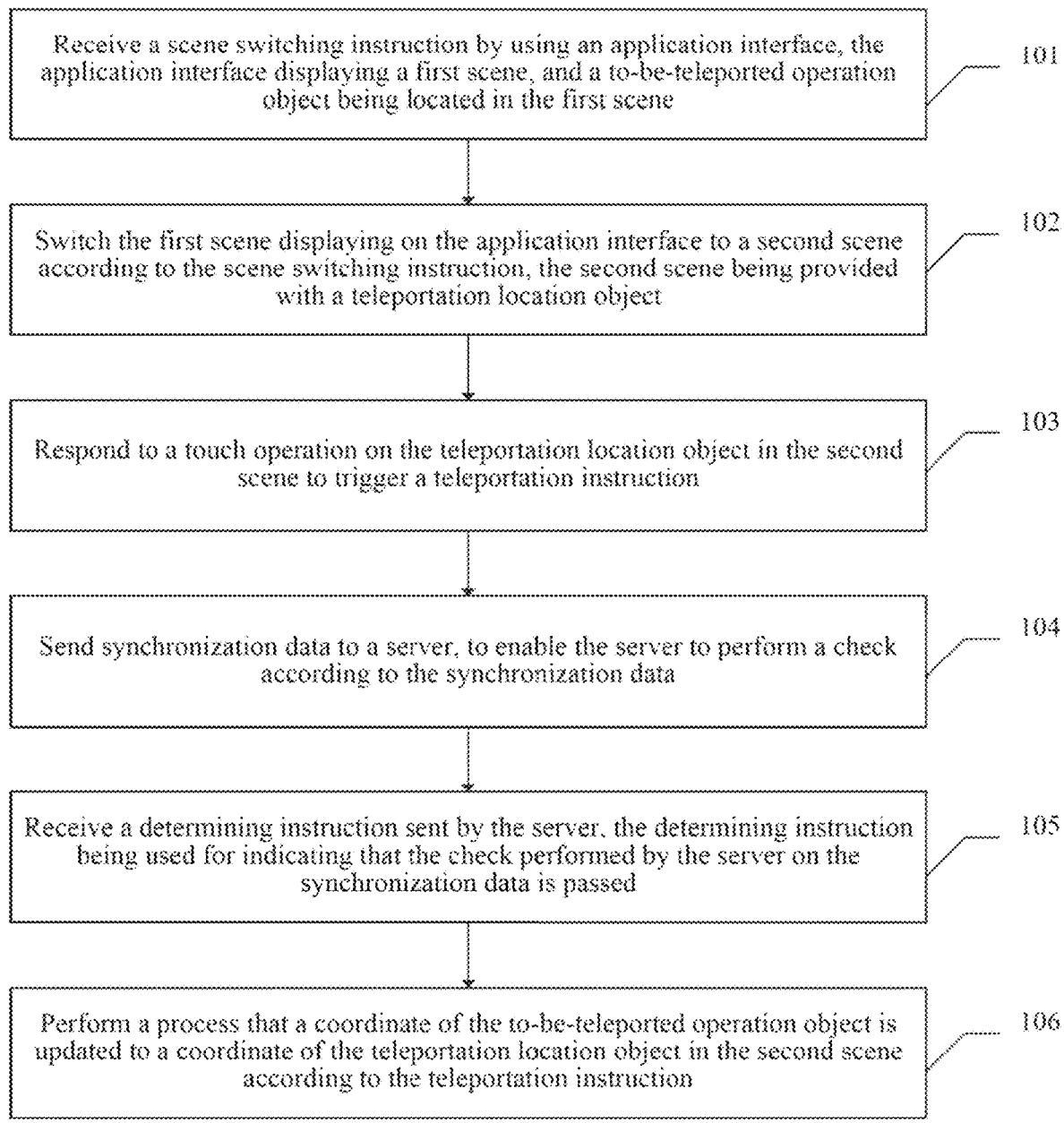
FIG. 6 is a schematic diagram of a data processing method according to an embodiment of the present disclosure.

Referring to FIG. 6, FIG. 6 is an embodiment of a data processing method according to the embodiments of the present disclosure. The entity for executing the data processing method is a mobile terminal, and the data processing method specifically includes the following steps:

In step 101, receive a scene switching instruction by using an application interface, the application interface displaying a first scene, and a to-be-teleported operation object being located in the first scene.

The application interface may be an application interface in the foregoing MOBA game. A user clicks a specified position on the screen of the mobile terminal by using a gesture operation, so that a scene switching instruction can be triggered. Optionally, the mobile terminal may receive the scene switching instruction by using a map on the application interface, and for example, the map is as the mini-map 100 shown in FIG. 3. That is, the user clicks a blank position on the mini-map, so that the scene switching instruction is triggered. Optionally, the user may also slide at a blank position in the first scene, so that the scene moves and changes. The to-be-teleported operation object is a character object manipulated by the user.

In step 102, switch the first scene displaying on the application interface to a second scene according to the scene switching instruction, the second scene being provided with a teleportation location object.

After receiving the scene switching instruction outputted by the user, the mobile terminal responds to the scene switching instruction, so that the first scene displaying on the application interface is switched to the corresponding second scene. If the second scene is provided with a teleportation location object, that is, the organ 200 or the eye 300 or the soldier (a player's soldier) as shown in FIG. 3, it represents that the user may click the teleportation location object, to enable the character object operated by the user to be teleported to the second scene.

Optionally, types of the teleportation location object includes a fixed teleportation location object type and a movable teleportation location object type, and an object of the fixed teleportation location object type is provided with teleportation indication information. The indication information may be an indication of adding a rendering effect into the fixed teleportation location object. The organ 200 and eye 300 are of a fixed teleportation location object type, and the soldier is of a movable teleportation location object type.

In step 103, respond to a touch operation on the teleportation location object in the second scene to trigger a teleportation instruction.

Optionally, before responding to the touch operation on the teleportation location object in the second scene to trigger the teleportation instruction, the mobile terminal may further determine, according to a current state of the to-be-teleported operation object, that a state of the teleportation function of the to-be-teleported operation object is an activated state. The activated state represents that the teleportation skill is available locally, and a deactivated state represents that the teleportation skill is not available locally.

After a user clicks a particular teleportation location object, the mobile terminal is enabled to respond to the touch operation, to trigger an operation of teleporting the to-be-teleported operation object to the position of the teleportation location object.

Optionally, when there are a plurality of teleportation location objects touched in the second scene, the method further includes:
  determining a teleportation location object closest to the to-be-teleported operation object as a target teleportation location object, and a coordinate of the target teleportation location object being used as teleportation a coordinate of the to-be-teleported operation object.

For example, in the second scene, there are two teleportation location objects, including: an organ and an eye. The distance between the organ and the eye is extremely near, fingers of a human are relatively thick, and if a user clicks one of the teleportation location objects, the other teleportation location object may be triggered at the same time. In this case, the mobile terminal obtains through calculation that the one of the two teleportation location objects triggered at the same time that is closest to the to-be-teleported operation object is the target teleportation location object. Therefore, the mobile terminal gets a specific coordinate, to enable the to-be-teleported operation object to be teleported smoothly to the second scene. Optionally, when the user triggers two or more teleportation location objects, the mobile terminal may further output an enlarge box, and enlarge and output the plurality of teleportation location objects triggered at the same time by the user, so that the user selects again one of the teleportation location objects as a target teleportation location object.

Optionally, when the teleportation location object touched in the second scene is of the movable teleportation location object type, the data processing method further includes:

adding a protection attribute to the movable teleportation location object, to prevent a state of the movable teleportation location object from being changed in a coordinate update process of the to-be-teleported operation object.

For example, when the touched teleportation location object is a soldier, to prevent the soldier from being killed or moved in the operation object teleportation process, causing loss of a coordinate and failure of teleportation, a protection attribute such as an immovable, attack disabled and invincible state may be added to the soldier.

Optionally, this embodiment of the present disclosure may also include the following steps:

In step 104, send synchronization data to a server, to enable the server to perform a check according to the synchronization data.

In step 105, receive a confirmation instruction sent by the server, the confirmation instruction being used for indicating that the check performed by the server on the synchronization data is passed.

As shown in FIG. 1, because an MOBA has to ensure consistency of data of all players, data of each player needs to be transmitted to other players through a server 30, that is, game data on a mobile terminal 10 needs to be forwarded to other mobile terminals through the server 30. However, to avoid that some players maliciously modify data, causing particular game characters to have excessively high skills, the server 30 not only is used for transmitting game data, but also needs to perform a check on synchronization data sent by all mobile terminals 10. Synchronization data sent by all the mobile terminals 10 is usually sent in the form of a frame. The server performs a check on synchronization frames. When data in the synchronization frames meets a preset game rule, the server 30 delivers each of the synchronization frames to each mobile terminal 10. Each mobile terminal 10 renders the data in each synchronization frame for display.

The check by the server 30 may further ensure when a repeated operation occurs due to instability of a network, a command is prevented from being repeatedly executed.

In step 106, perform a process in which a coordinate of the to-be-teleported operation object is updated to a coordinate of the teleportation location object in the second scene according to the teleportation instruction.

When the mobile terminal receives an operation of touching the teleportation location object by the user, that the to-be-telephoned operation object is teleported to the position of the teleportation location object can be executed. The teleportation is a teleportation process as shown in FIG. 4, which may be set to be approximately three seconds long. In addition, the teleportation skill can further be provided with another attached attribute, for example, an interval of using the teleportation skill twice is 100 seconds.

Optionally, in a process of updating a coordinate of the to-be-teleported operation object to a coordinate of the position of the teleportation location object in the second scene according to the teleportation instruction, when the state of the to-be-teleported operation object changes, the update process of the current coordinate may be interrupted.

In a teleportation process, if the state of the operation object changes, such as dying, or being attacked or moving, or another state change, the teleportation process is interrupted, so that the operation object is not teleported to the position of the teleportation location object, and the second scene of the application interface is switched to the first scene in which the operation object is located.

Compared with the related art in which a complexity degree is high when interactive applications are operated on a mobile terminal, the data processing method provided in this embodiment of the present disclosure may provide the teleportation location object in the second scene, when a user touches the teleportation location object, the to-be-teleported operation object is teleported to the position of the teleportation location object in the second scene, and based on the personalized interface settings, interactive operations are reduced, so that operational complexity on the mobile terminal is reduced.

Figure 7:
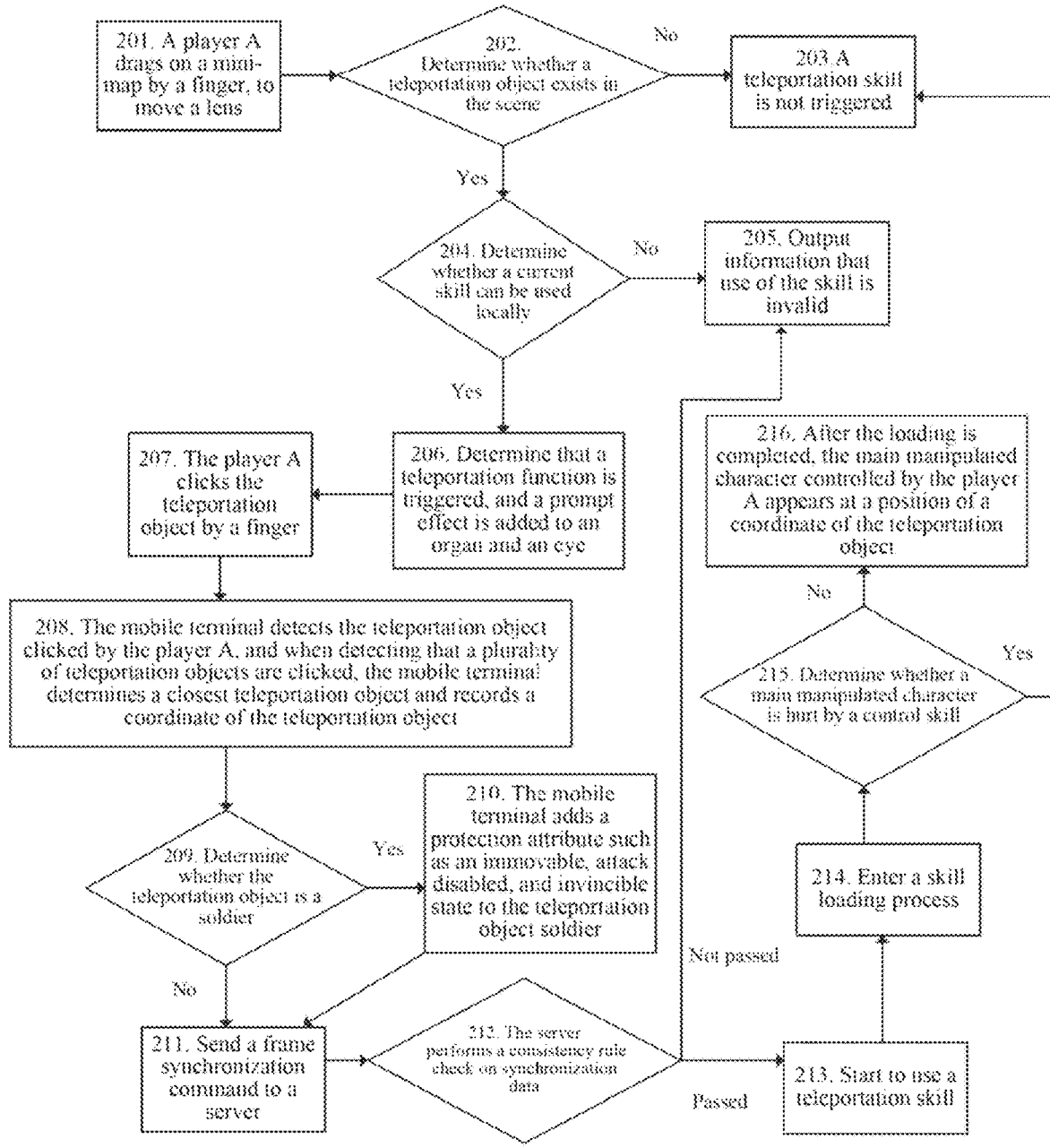
FIG. 7 is another schematic diagram of a data processing method according to an embodiment of the present disclosure.

Referring to FIG. 7, FIG. 7 is another embodiment of a data processing method according to the embodiments of the present disclosure, and the data processing method specifically includes the following steps:

In step 201, a player A drags on a mini-map by a finger, to move a lens.

In step 202, a mobile terminal determines whether a teleportation object exists in the scene, and if not, perform step 203; or if yes, perform step 204.

In step 203, a teleportation skill is not triggered.

In step 204, determine whether a current skill can be used locally, and if not, perform step 205, or if yes, perform step 206.

In step 205, output information that use of the skill is invalid.

In step 206, determine that a teleportation function is triggered, and a prompt effect is added to an organ and an eye.

In step 207, the player A clicks the teleportation object by a finger.

In step 208, the mobile terminal detects the teleportation object clicked by the player A, and when detecting that a plurality of teleportation objects are clicked, the mobile terminal determines a closest teleportation object and records a coordinate of the teleportation object.

In step 209, determine whether the teleportation object is a soldier, and if yes, perform step 210; or if not, perform step 211.

In step 210, the mobile terminal adds a protection attribute such as an immovable, attack disabled, and invincible state to the teleportation object soldier.

In step 211, send a frame synchronization command to a server.

In step 212, the server performs a consistency rule check on synchronization data, and if the check is not passed, perform step 205; or if the check is passed, perform step 213.

In step 213, start to use a teleportation skill.

In step 214, enter a skill loading process.

In step 215, determine whether a main manipulated character is hurt by a control skill, and if yes, perform step 203; or if not, perform step 216.

In step 216, after the loading is completed, the main manipulated character controlled by the player A appears at a position of a coordinate of the teleportation object.

Figure 8:
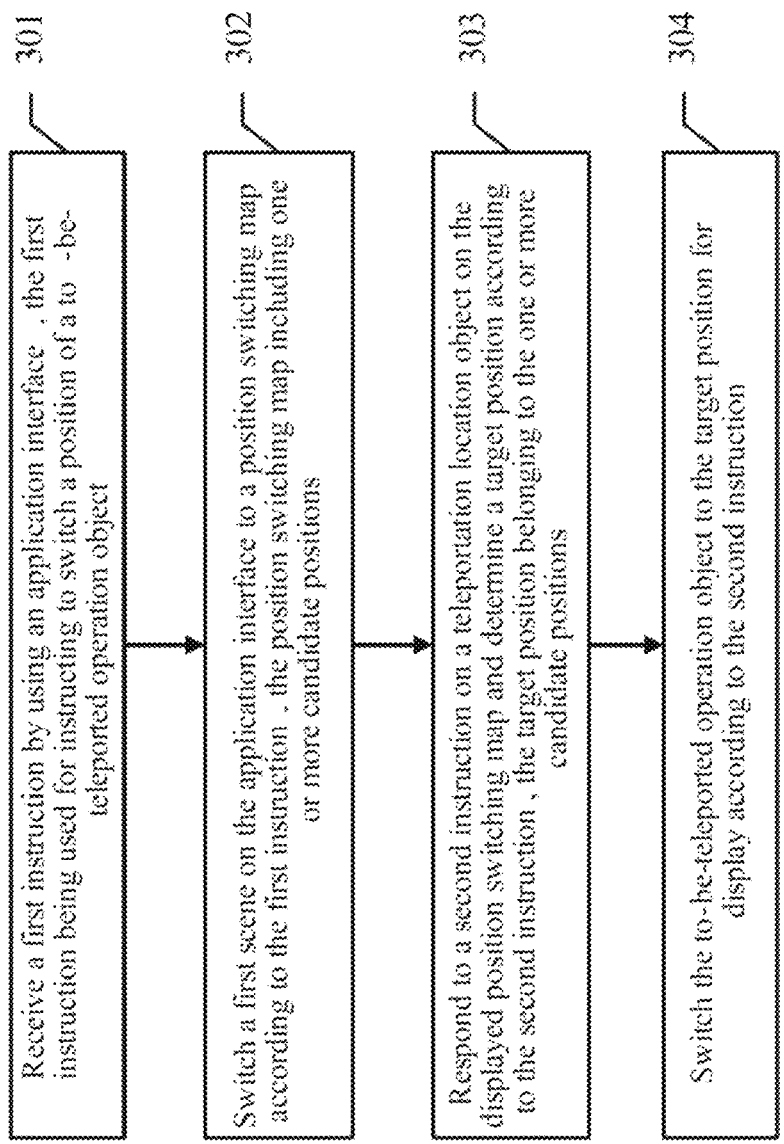
FIG. 8 is another schematic diagram of a data processing method according to an embodiment of the present disclosure.

Referring to FIG. 8, FIG. 8 is another embodiment of a data processing method according to the embodiments of the present disclosure, and the data processing method is used to perform a teleportation based on a position switching map. The data processing method specifically includes the following steps:

In step 301, receive a first instruction at a first scene on an application interface, the first instruction being used for instructing to switch a position of a to-be-teleported operation object.

A mobile terminal receives the first instruction delivered by a player, the first instruction being used for instructing to switch a position of a mock object. Because the mobile terminal can receive the instruction delivered by the player by using a touch screen, the first instruction may be used in a form of touch instruction.

Figure 9:
FIG. 9 is a schematic diagram of an example of an operation interface according to this application.
Figure 10:
FIG. 10 is a schematic diagram of another example of an operation interface according to this application.

In this application, a function of switching the position of the mock object can be presented to the player in a form of "teleportation" skill on a user interface (UI) layer. FIG. 2, FIG. 9 and FIG. 10 are used as examples:

Before a game is started, a player is required to select one or more skills to be used in the current arena game for the player's hero character. At this moment, the player needs to click and select an icon of a teleportation skill, and the icon is pointed by an arrow 201 as shown in FIG. 2.

After the player selects skills to be used in the current arena game, the selected skills are presented on the character information interface of the hero for the player, as shown in FIG. 9. The icon of the teleportation skill of the player can be seen at a lower right corner of FIG. 9 indicated by an arrow 901.

In a process of the game, the icon (indicated by an arrow 1001) of the teleportation skill is displayed on an operation interface of the game, as shown in FIG. 10. The icon of the teleportation skill of the player can be learned from a lower place of FIG. 10. The player clicks the icon, and the mobile terminal receives the click operation (that is, a first instruction) and determines that the player requires enabling a teleportation skill to switch the position of the hero character.

In step 302, switch the first scene on the application interface to a position switching map according to the first instruction, the position switching map including one or more candidate positions. The position switching map is also referred to as a position teleportation map.

After receiving the first instruction, the mobile terminal determines that the player requires enabling the teleportation skill to switch the position of the hero character. Therefore, the mobile terminal switches the first scene on the application interface to the position switching map. The position switching map includes one or more candidate positions. Each candidate position is used for indicating a position to which the hero character can be switched by the player.

Optionally, the candidate position may be a coordinate position of a resource object (such as an organ, an eye of the player's team, or a soldier of the player's team) of the hero character, so that the player can directly teleport the hero character to the resource object, and uses the resource object to combat. It should be note that, in this embodiment, the resource object of the hero character should have the same preset attribute as the hero character, and the preset attribute is used for indicating a team to which the mock object and the resource object belong. That is, the hero character of the player can be switched only to a position of the resource object (such as an organ, an eye of the player's team, or a soldier of the player's team) of the player's team.

Optionally, in a process of displaying the position switching map, the mobile terminal may obtain the coordinate position of the resource object of the player's team in a manner such as scanning, and then display an icon of the resource object of the player's team on the coordinate position that is of the resource object of the player's team and that is on the position switching map, where different types of resource objects may have different icons.

Optionally, to facilitate direct recognition, on the position switching map, of the resource object of the player's team by the player, the mobile terminal may add an effect to the resource object of the player's team, such as a highlight, or an arrow indication. Optionally, if there are a relatively large quantity of soldiers, for aesthetics of the operation interface, the mobile terminal may the add effect only to the organ and the eye.

Optionally, the mobile terminal may further display positions of a mock object (e.g., character object, hero character) and/or a resource object of the enemy team on a position switching map, to provide reference information for combat of the player. To facilitate distinction for the player, an icon form of the mock object and/or the resource object of the enemy team should be different from those of the player's team. For example, colors of the icons are different, or effects of the icons are different.

Figure 11:
FIG. 11 is a schematic diagram of another example of an operation interface according to this application.

Existing MOBA mobile games generally have a game map, configured to present information such as preset topographical features in the game. Different from the existing game map, the position switching map is a map additionally provided in this application for switching a mock object. FIG. 11 is an example of a game operation interface displaying a position switching map 1101, and the dark grey area on a top-right part of the operation interface is the position switching map 1101. Icons of a plurality of resource objects of the player's team are presented on a lower left side of the position switching map 1101, and icons of a plurality of resource objects of the enemy team are marked on an upper right side of the position switching map. The position switching map and an ordinary game map have different original design intentions. Therefore, the position switching map and the ordinary game map may have different display forms on a UI aspect. The following describes differences between the position switching map provided in this application and the ordinary game map by using FIG. 11 as an example.

The position switching map displays on a right pan of an operation interface; an existing ordinary game map generally displays on a left part of an operation interface.

On the position switching map, an icon of a resource object may be set to be relatively large, to improve accuracy when a player clicks the icon; on the existing ordinary game map, there are a relatively large quantity of icons, therefore each icon is generally set to be relatively small.

On the position switching map, an icon of a resource object is displayed first, and an icon of a mock object is then displayed; on the existing ordinary game map, an icon of a mock object is generally displayed first, and an icon of a resource object is then displayed.

On the existing ordinary game map, corresponding information may be broadcasted when a player clicks a particular icon; the position switching map does not provide a function of broadcasting information.

The foregoing lists differences between the position switching map and the ordinary game map by using an example. During actual application, the position switching map may have one or more of the foregoing differences, or may not have the foregoing differences. This application is not limited thereto.

Optionally, if the first instruction in step 301 is caused by an accidental touch of an icon of a teleportation skill by a player, the player may click again the icon of the teleportation skill to deliver a touch instruction to the mobile terminal. When receiving the touch instruction, the mobile terminal turns off the position switching map, and does not perform the subsequent step 303 and 304.

In step 303, respond to a second instruction on a teleportation location object on the displayed position switching map and determine a target position according to the second instruction, the target position belonging to the one or more candidate positions.

After displaying the position switching map on the operation interface, the mobile terminal receives a second instruction, and determines a target position according to the second instruction. The target position belongs to one or more candidate positions determined in step 302.

The second instruction may also be represented in a form of touch instruction. Specifically, the player clicks the area of the position switching map on the screen of the mobile terminal, the mobile terminal receives the click operation (that is, the second instruction), and determines a touch effective range of the click operation. The touch effective range is used for representing an area range of the screen of the mobile terminal touched by the player. A candidate position in the touch effective range of the second instruction is the target position.

For example, if the candidate position is a coordinate position of a resource object of the player's team, the player clicks an icon of the resource object A on the position switching map, and the mobile terminal receives the click operation and determines that the touch effective range of the click operation includes the icon of the resource object A. Therefore, the mobile terminal determines that the coordinate position of the resource object A is the target position.

Optionally, if a touch effective range of a second instruction includes icons of a plurality of resource objects, the mobile terminal determines a touch coordinate of the second instruction. Specifically, the center point of the touch effective range of the second instruction may be used as the touch coordinate of the second instruction, or another manner may be used for determining the touch coordinate of the second instruction. Then, the mobile terminal determines the coordinate position of the resource object corresponding to an icon closest to the touch coordinate of the second instruction as the target position.

Optionally, if the touch effective range of the second instruction does not include an icon of any resource object, it may be considered that the current second instruction is invalid, and the mobile terminal does not determine the target position according to the current second instruction.

In step 304, switch the to-be-teleported operation object to the target position for display according to the second instruction.

After determining the target position, the mobile terminal switches the mock object (e.g., character object) to the target position for display. In this way, implementation of the teleportation skill is completed, and position switch of the mock object is implemented.

Optionally, during actual game operation, when the mobile terminal switches a position of the mock object, a segment of time (for example, several seconds) is needed to perform operations such as loading and calculation of data. The segment of time may be represented in a form of skill loading on an operation interface of the game to a player.

Optionally, in a process of skill loading, if a hero character is attacked and hurt by an enemy team, the mobile terminal may stop performing step 304, and interrupt implementation of the current teleportation skill.

Figure 12:
FIG. 12 is a schematic diagram of another example of an operation interface according to this application.
Figure 13:
FIG. 13 is a schematic diagram of another example of an operation interface according to this application.

Optionally, after the mobile terminal starts to switch a position of a mock object, a game lens may be moved to a resource object corresponding to a target position, as shown in FIG. 4, FIG. 12, and FIG. 13. FIG. 12 is a schematic diagram in which a resource object corresponding to a target position is an organ. FIG. 4 is a schematic diagram in which a resource object corresponding to a target position is an eye. FIG. 13 is a schematic diagram in which a resource object corresponding to a target position is a soldier. After teleportation succeeds, a hero character of a player appears at the target position, and specifically appears at a side of a resource object corresponding to the target position.

Optionally, if the resource object corresponding to the target position is a soldier, in a process of performing the teleportation skill of the hero character, the soldier at the target position may have the following one or more effect bonuses: immovable, that is, the position of the soldier is fixed, and the soldier cannot move; invincible, that is, the soldier will not be hurt by an enemy team; having no attack ability, that is, the soldier will not proactively launch an attack against the enemy team.

In this embodiment, after the mobile terminal receives the first instruction delivered by the player, the position switching map is generated to display for the player, and according to the target position selected on the position switching map by the player, the mock object is switched to the target position for display. Based on such a method, the mock object can be teleported to the target position in one go, and it is unnecessary to click manually for a plurality of times to form a movement route of the mock object. Compared with the related art, in this embodiment, both operation comfort and convenience of a mobile game are greatly improved, and user experience is relatively good.

Optionally, after performing step 301, the mobile terminal may further determine whether the current mock object satisfies a preset condition, and if the current mock object satisfies the preset condition, an operation of performing step 302 is triggered to execute. The preset condition is mainly used for determining whether a position of the mock object can be currently switched. In a scene in which the mock object is a hero character, the preset condition is specifically used for determining whether a teleportation skill of the hero character is currently available. For example, the preset condition may be one or more of the following conditions: Duration between the current moment and the moment at which the hero character last uses the teleportation skill reaches a cooling time of the teleportation skill, the hero character is not in a state of death currently, or the teleportation skill of the hero character is not controlled by an enemy team currently.

Optionally, to ensure consistency of data of all players in a MOBA mobile game, game data of each player should be transmitted to other players by using a server in the mobile game. That is, game data on one mobile terminal should be forwarded to other mobile terminals by the server. Game data transmitted by a server is usually presented in a form of a synchronization data frame. To avoid that some players maliciously modify data, causing particular game characters to have excessively high skills, each mobile terminal further need to perform a synchronization check on game data of other mobile terminals. For example, in this embodiment, after receiving, in step 303, a second instruction of a player, the mobile terminal may obtain synchronization data frames of other mobile terminals from the server, and perform a synchronization check according to these synchronization data frames and other mobile terminals. If the synchronization check is passed, step 304 is triggered to be performed;

or if the synchronization check is not passed, the mobile terminal does not perform step 304, and interrupts implementation of the current teleportation skill.

Figure 14:
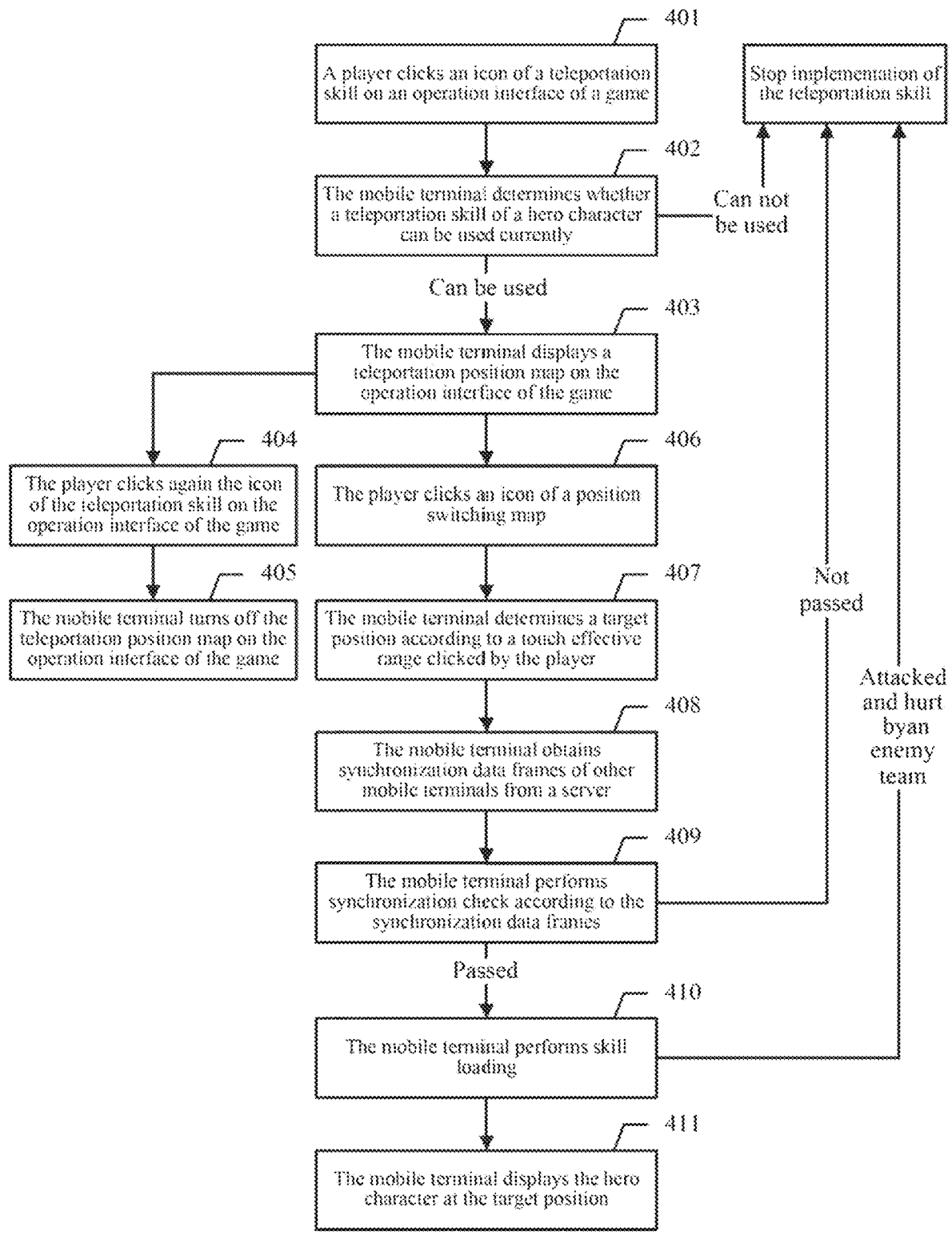
FIG. 14 is a flowchart of a data processing method according to an embodiment of the present disclosure.

The following describes another embodiment of a data processing method according to this application with reference to FIG. 14, and the data processing method includes:

In step 401, a player clicks an icon of a teleportation skill on an operation interface of a game.

In step 402, the mobile terminal determines whether a teleportation skill of a hero character can be used currently, and if a determining result is yes, perform step 403; or
if the determining result is no, stop implementation of the teleportation skill.

In step 403, the mobile terminal displays a teleportation position map on the operation interface of the game.

In step 404, the player clicks again the icon of the teleportation skill on the operation interface of the game.

In step 405, the mobile terminal turns off the teleportation position map on the operation interface of the game.

In step 406, the player clicks an icon of a position switching map.

In step 407, the mobile terminal determines a target position according to a touch effective range clicked by the player.

In step 408, the mobile terminal obtains synchronization data frames of other mobile terminals from a server.

In step 409, the mobile terminal performs synchronization verification according to the synchronization data frames, and if the synchronization check is passed, perform step 410; or
if the synchronization check is not passed, stop implementation of the teleportation skill.

In step 410, the mobile terminal performs skill loading, and in a process of skill loading, if the hero character is attacked and hurt by an enemy team, stop implementation of the teleportation skill.

In step 411, the mobile terminal displays the hero character at the target position.

This embodiment provides a more detailed object position switch method, which can teleport a mock object to a target position in one go, and it is unnecessary to click manually for a plurality of times to form a movement route of the mock object. Compared with the related art, in this embodiment, both operation comfort and convenience of a mobile game are greatly improved, and user experience is relatively good.

Figure 15:
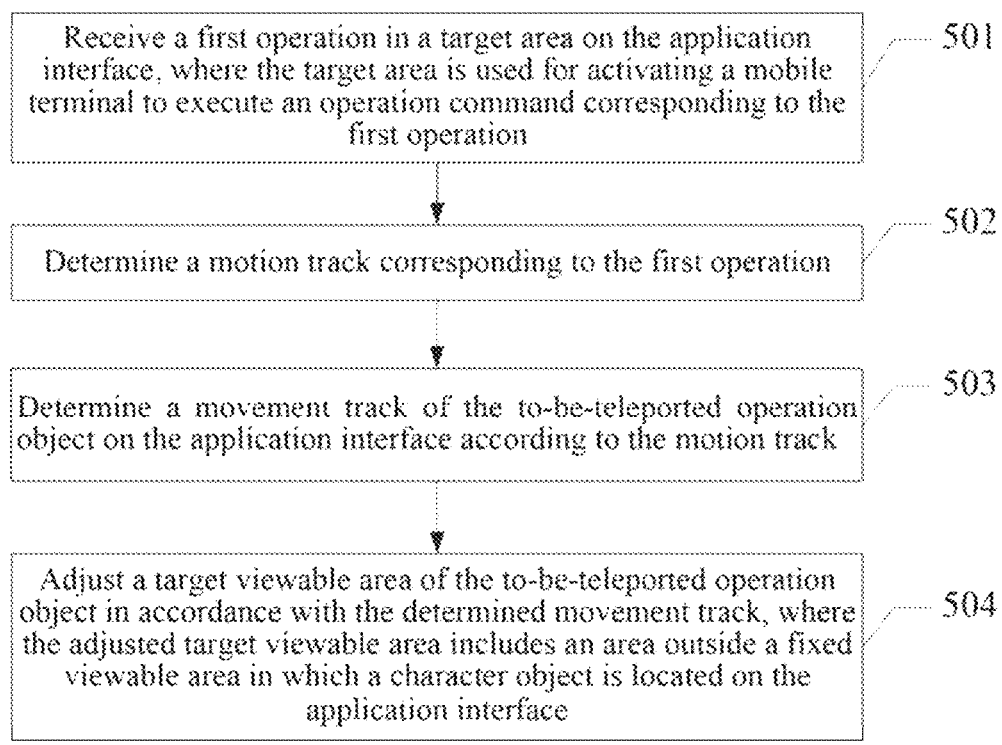
FIG. 15 is another schematic diagram of a data processing method according to an embodiment of the present disclosure.

Referring to FIG. 1S, FIG. 15 is another embodiment of a data processing method according to the embodiments of the present disclosure, and the data processing method specifically includes the following steps:

In step 501, receive a first operation in a target area on the application interface, where the target area is used for activating a mobile terminal to execute an operation command corresponding to the first operation.

The mobile terminal provides a user display interface for a user to input the first operation, where the target area is a blank area on an application interface of the user display interface, and visual sensation of the user on the application interface is not affected. An application interface of a game, Kings of Glory, is used as an example, and the target area is set in a blank area of a UI layer in a virtual game scene, where the target area is used for activating the mobile terminal to perform an operation command corresponding to the first operation. If the operation command corresponding to the first operation is not activated, the first operation cannot be performed in the target area. The target area is a user-defined area or a default area of the mobile terminal. This is not limited herein. In addition, the UI layer is a layer in which an icon exists on the user interface.

The user inputs the first operation in the target area in a particular operation manner. The first operation includes but is not limited to contact or non-contact operation in the target area by the user. For example, the user uses any appropriate object such as a body, a hand, a finger, a stylus, or a touch glove to operate in the target area. The first operation includes a single point control operation, or includes a multi-point control operation, or an operation of another type; the operation includes a two-dimensional plane operation, or includes a three-dimensional operation; the operation includes a click, a double-click, a slide, a throw, a touch and hold, a force touch, a rotation, or the like, or includes an operation manner that a future technology allows.

In some possible implementations, the first operation includes at least one of the slide and the click.

In some possible implementations, if a first operation option is triggered, an operation command corresponding to the first operation option is executed, where the first operation option is an operation option for enabling a movement function of a to-be-teleported operation object.

Before the first operation is received, the first operation option is generally triggered, that is, a mobile function of the to-be-teleported operation object is enabled. Otherwise, even if a user inputs the first operation in the target area, the mobile terminal cannot be triggered to execute any function. Certainly, in other possible implementations, the first operation option is in a default triggered state, so that the operation command corresponding to the first operation option does not need to be executed again. This is not limited herein.

In some possible implementations, after the operation command corresponding to the first operation option is executed, an instruction of hiding an icon of the target area is received, and the icon of the target area is not displayed on the user display interface; or, a display instruction on the icon of the target area is received, and the icon of the target area is displayed on the user display interface.

In this embodiment of the present disclosure, the icon corresponding to the target area may not be displayed on the user display interface, or may be displayed on the user display interface. The icon corresponding to the target area may be an icon of any logo or any shape such as a circular, a rectangular, or a sector. This is not limited herein. During actual application, it may be selected and based on user requirements whether an icon corresponding to a target area is displayed on a user display interface, or a default manner of a mobile terminal is used for selecting whether the icon corresponding to the target area is displayed on the user display interface. If the icon is displayed on the user display interface, the user can clearly determine the target area, and perform a first operation on the target area. If the icon is not displayed on the user display interface, an approximate position of the target area is first determined by the user, and the first operation is performed. Certainly, a clear sense of the whole screen is higher, and visual sensation of a user in a process of using the application is completely not obstructed.

In step 502, determine a motion track corresponding to the first operation.

In this embodiment of the present disclosure, the motion track is a space feature of an action formed by a route by which the first operation passes from a start position to an end position. The motion track is represented by using a motion track direction, a motion track form and a motion range, and the motion track form mainly includes two forms: a linear form, or a curve form. If the first operation is a slide, the mobile terminal detects and uses a track of the slide performed by a user finger as a motion track corresponding to the slide. If the first operation is a click, an object used for indicating a motion track is determined in a user click manner. For example, the object is a joystick, and a track of a movement of the joystick is detected and used as a motion track corresponding to the click.

In step 503, determine a movement track of the to-be-teleported operation object on the application interface according to the motion track.

In this embodiment of the present disclosure, the motion track corresponding to the first operation has a correspondence with the movement track of the to-be-teleported operation object on the application interface. After the motion track corresponding to the first operation is determined, a particular calculation manner may be used for determining the movement track of the to-be-teleported operation object on the application interface.

In step 504, adjust a target viewable area of the to-be-teleported operation object in accordance with the determined movement track, where the adjusted target viewable area includes an area outside a fixed viewable area in which a character object is located on the application interface.

After the movement track of the to-be-teleported operation object is determined, the target viewable area of the to-be-teleported operation object is adjusted on the application interface in accordance with the movement track, where the adjusted target viewable area includes an area outside the fixed viewable area in which a character object is located on the application interface, that is, a viewable area of the to-be-teleported operation object on the application interface is enlarged. As can be learned, that the motion track corresponding to the first operation is used for determining the movement track of the to-be-teleported operation object on the application interface, and that the viewable area of the to-be-teleported operation object is adjusted in real time in accordance with the movement track have high sensitivity and can be simply operated, so that the viewable area of the to-be-teleported operation object on the application interface can be flexibly and quickly adjusted.

Figure 16:
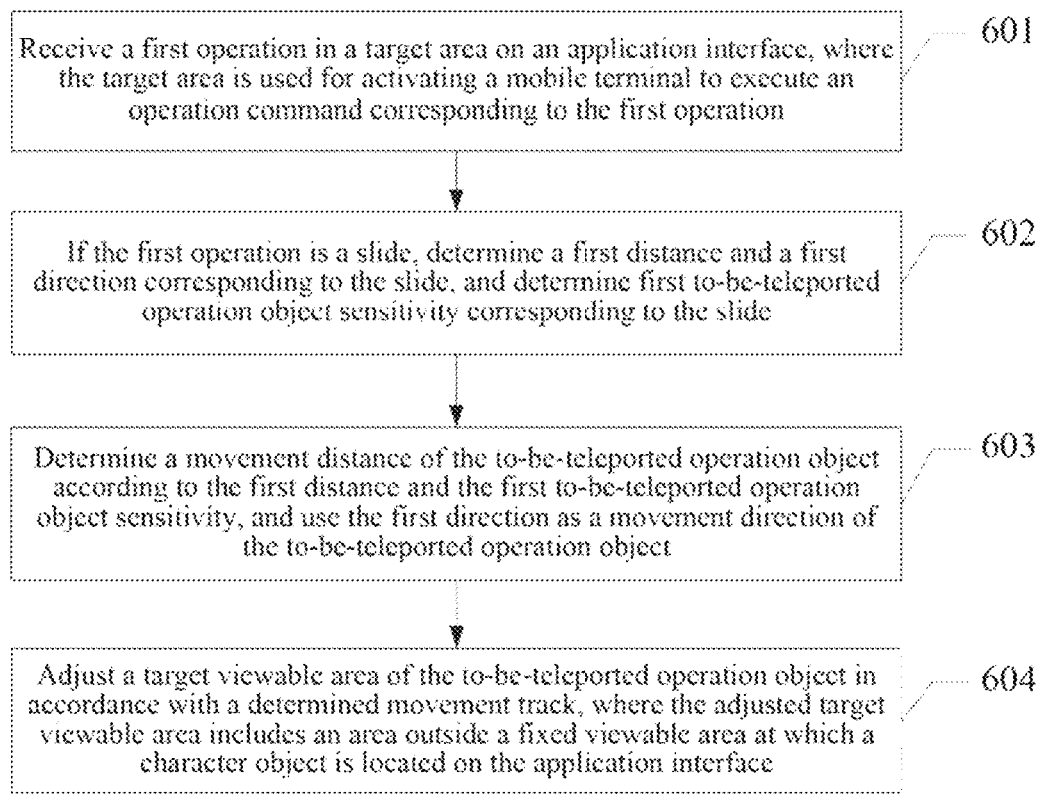
FIG. 16 is another schematic diagram of a data processing method according to an embodiment of the present disclosure.

Referring to FIG. 16, FIG. 16 is another embodiment of a data processing method according to the embodiments of the present disclosure, and the data processing method specifically includes the following steps;

In step 601, receive a first operation in a target area on an application interface, where the target area is used for activating a mobile terminal to execute an operation command corresponding to the first operation.

It should be noted that, step 601 is the same as or similar to step 501 shown in FIG. 15. For specific steps, refer to descriptions of step 501. Details are not described herein again.

In step 602, if the first operation is a slide, determine a first distance and a first direction corresponding to the slide, and determine first to-be-teleported operation object sensitivity corresponding to the slide.

If the first operation is the slide, the mobile terminal detects and determines the first distance and the first direction corresponding to the slide. The first distance is a displacement formed by a route by which the slide passes from a start position to an end position, and the first direction is a direction used by the route by which the slide passes from the start position to the end position.

The first to-be-teleported operation object sensitivity corresponding to the slide may be user-defined or may be a default to-be-teleported operation object sensitivity of the mobile terminal. This is not limited herein. If having a relatively high requirement on the to-be-teleported operation object sensitivity, the user may set the first to-be-teleported operation object sensitivity as high, or if having a relatively low requirement on the to-be-teleported operation object sensitivity, the user may set the first to-be-teleported operation object sensitivity as low. A specific setting may be performed according to an actual requirement of the user. This is not limited herein.

In step 603, determine a movement distance of the to-be-teleported operation object according to the first distance and the first to-be-teleported operation object sensitivity, and use the first direction as a movement direction of the to-be-teleported operation object.

In this embodiment of the present disclosure, because a movement track of the to-be-teleported operation object has a correspondence with a motion track corresponding to the first operation, after the first distance, the first to-be-teleported operation object sensitivity, and the first direction are obtained, a movement distance of the to-be-teleported operation object on the application interface may be determined according to a particular calculation manner, and the first direction is used as the movement direction of the to-be-teleported operation object on the application interface. During actual application, according to a formula: a movement distance of a to-be-teleported operation object=a first distance*first to-be-teleported operation object sensitivity, a movement distance of an operation layer corresponding to the to-be-teleported operation object on the application interface is calculated. A game is used as an example, and the operation layer is a scene layer on which a game character walks and UI layer operations are completed.

In step 604, adjust a target viewable area of the to-be-teleported operation object in accordance with a determined movement track, where the adjusted target viewable area includes an area outside a fixed viewable area at which a character object is located on the application interface.

After the movement track of the to-be-teleported operation object is determined, the to-be-teleported operation object is moved on the application interface in accordance with the determined movement track, and the target viewable area of the to-be-teleported operation object is adjusted in real time. As can be learned, that the movement track of the to-be-teleported operation object on the application interface is determined by using the motion track corresponding to the slide has a high sensitivity and is simply operated, so that the target viewable area of the to-be-teleported operation object can be flexibly and quickly adjusted.

Figure 17:
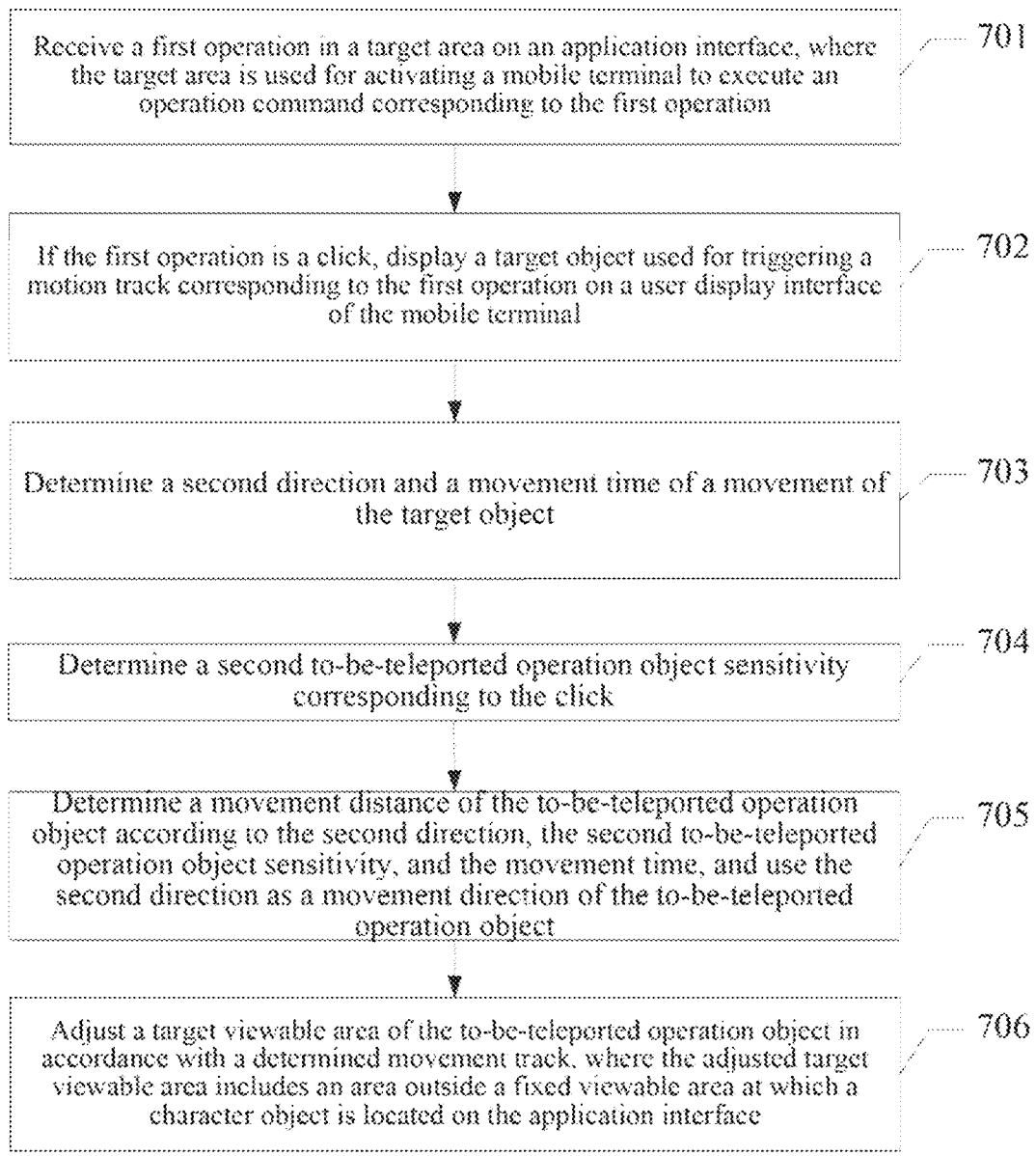
FIG. 17 is another schematic diagram of a data processing method according to an embodiment of the present disclosure.

Referring to FIG. 17, FIG. 17 is another embodiment of a data processing method according to the embodiments of the present disclosure, and the data processing method specifically includes the following steps:

In step 701, receive a first operation in a target area on an application interface, where the target area is used for activating a mobile terminal to execute an operation command corresponding to the first operation.

It should be noted that, step 701 is the same as or similar to step 501 shown in FIG. 15. For specific steps, refer to descriptions of step 501. Details are not described herein again.

In step 702, if the first operation is a click, display a target object used for triggering a motion track corresponding to the first operation on a user display interface of the mobile terminal.

Different from that in the embodiment shown in FIG. 16, if the first operation is a click, the target object used for triggering the motion track corresponding to the first operation is first displayed on the user display interface, where the object may be a joystick, and is marked by using a shape such as an arrow or a line. As can be learned, the motion track corresponding to the click is determined based on the target object.

During actual application, when a user clicks in a target area on a user display interface, the target object (e.g., a joystick) is triggered for display.

In step 703, determine a second direction and a movement time of a movement of the target object (e.g., a joystick).

In step 704, determine a second to-be-teleported operation object sensitivity corresponding to the click.

If the first operation is a click, the mobile terminal detects and determines the second direction and the movement time of the movement of the target object (e.g., joystick). The second direction is a direction used by a route by which the target object passes from a start position to an end position. The movement time is a time used by the target object from the start position to the end position.

The first to-be-teleported operation object sensitivity corresponding to the slide may be a user-defined or a default to-be-teleported operation object sensitivity of the mobile terminal. This is not limited herein. If having a relatively high requirement on the to-be-teleported operation object sensitivity, the user may set the second to-be-teleported operation object sensitivity to be high, or if having a relatively low requirement on the to-be-teleported operation object sensitivity, the user may set the second to-be-teleported operation object sensitivity to be low. A specific setting may be performed according to an actual requirement of the user. This is not limited herein.

In step 705, determine a movement distance of the to-be-teleported operation object according to the second direction, the second to-be-teleported operation object sensitivity, and the movement time, and use the second direction as a movement direction of the to-be-teleported operation object.

In this embodiment of the present disclosure, because the movement track of the to-be-teleported operation object has a correspondence with the motion track corresponding to the first operation, after the second direction, the second to-be-teleported operation object sensitivity, and the movement time are obtained, a movement distance of the to-be-teleported operation object on the application interface may be determined according to a particular calculation manner, and the second direction is used as the movement direction of the to-be-teleported operation object on the application interface. During actual application, according to a formula: a movement distance of a to-be-teleported operation object=a second direction*a second to-be-teleported operation object sensitivity*a movement time, where * represents a multiplication, and a movement distance of an operation layer corresponding to the to-be-teleported operation object on the application interface is calculated.

In step 706, adjust a target viewable area of the to-be-teleported operation object in accordance with a determined movement track, where the adjusted target viewable area includes an area outside a fixed viewable area at which a character object is located on the application interface.

After the movement track of the to-be-teleported operation object is determined, the target viewable area of the to-be-teleported operation object is adjusted in accordance with the determined movement track. As can be learned, that the movement track of the to-be-teleported operation object on the application interface is determined by using the motion track corresponding to the click has high sensitivity and is simply operated, so that the target viewable area of the to-be-teleported operation object can be flexibly and quickly adjusted.

The game, Kings of Glory, is used as an example, and this embodiment of the present disclosure is described from a perspective of a product application.

Figure 18:
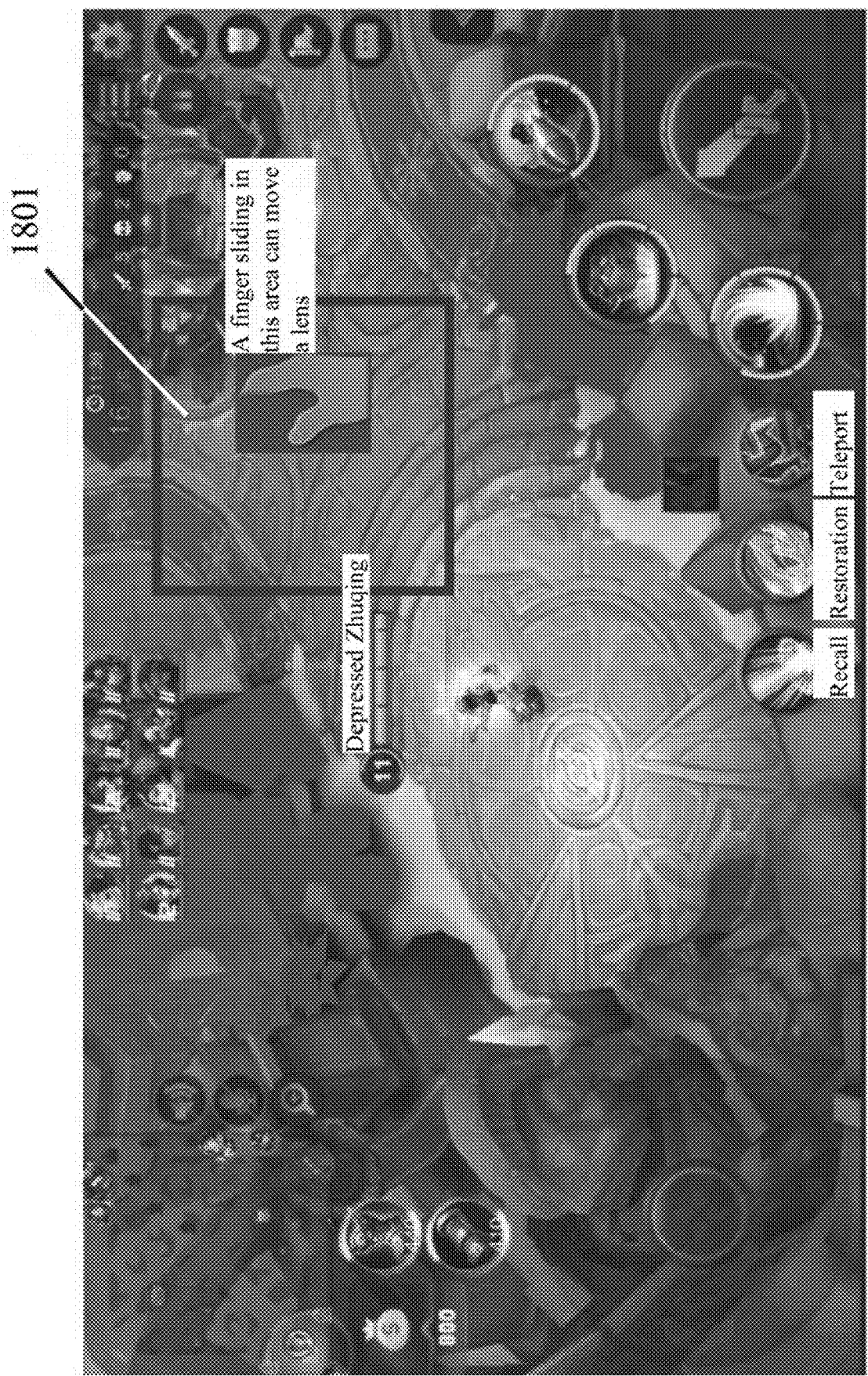
FIG. 18 is a schematic diagram of an application scene of a method of adjusting a viewable area of a to-be-teleported operation object on an application interface according to an embodiment of the present disclosure.

As shown in FIG. 18, a target area 1801 is divided out from a right side of a screen, and a finger slides in the target area 1801, so that a to-be-teleported operation object of a hero can be moved. The target area may be set on the right side of the screen in a hidden manner, where an appropriate area is a range of a rectangular box 1801 shown in FIG. 18, and a size of the range can be configured according to an actual requirement.

Figure 19:
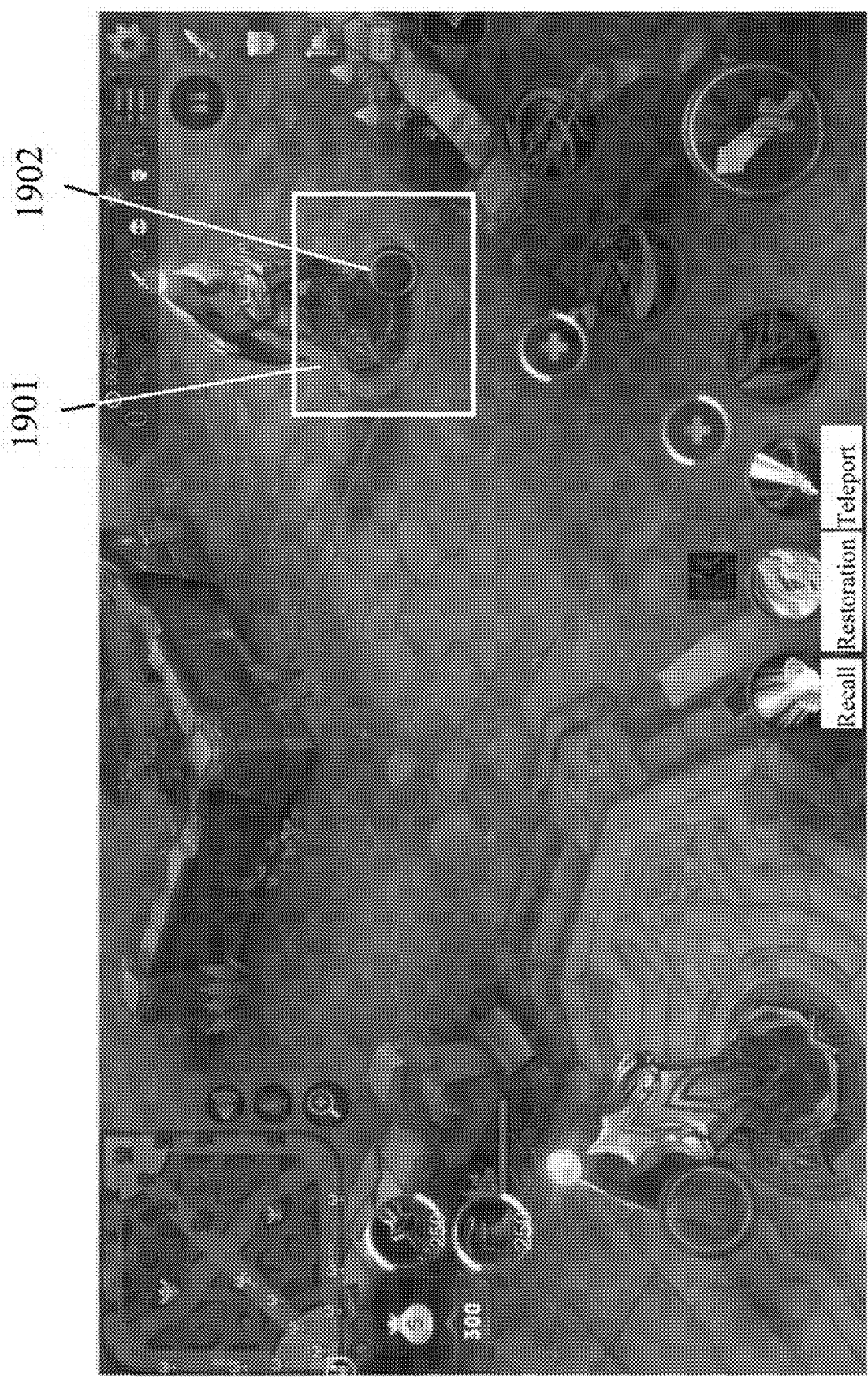
FIG. 19 is a schematic diagram of another application scene of a method of adjusting a viewable area of a to-be-teleported operation object on an application interface according to an embodiment of the present disclosure.

A player performs a first operation in the target area, thereby enabling a movement of the to-be-teleported operation object. The movement of the to-be-teleported operation object can be divided into two manners: The first one is a slide by using a finger. The player slides a finger in the target area, and the to-be-teleported operation object moves in a direction as the finger slides. A movement function of the to-be-teleported operation object is triggered only if the finger slides in the target area. If the finger moves out of the target area, that is, a maximum range is reached, the movement of the to-be-teleported operation object cannot be controlled. The second one is a slide by using a joystick. The player clicks in the target area, and a joystick of moving a to-be-teleported operation object is called out. As shown in FIG. 19, in a rectangular box 1901, the joystick 1902 is slid by using a finger to control the to-be-teleported operation object to move, and a range in which the joystick is slid is not limited. A relationship between a slide distance of the to-be-teleported operation object and a movement distance of the finger is: if the slide is a slide by using a finger, a movement distance of the to-be-teleported operation object=a slide distance of the finger*a coefficient N of to-be-teleported operation object sensitivity, where the coefficient N has a range, and the player may configure the range in settings. If the slide is a slide by using a joystick, a movement distance of the to-be-teleported operation object=a slide direction of the joystick*a coefficient M of to-be-teleported operation object sensitivity*a time, where the coefficient M has a range, and the player may configure the range in settings. If the player does not relax the player's hold, the to-be-teleported operation object stays in an area in which the to-be-teleported operation object moves, and after the player relaxes the player's hold, the to-be-teleported operation object automatically returns to a hero head.

During actual application, a procedure of using a movement function of the to-be-teleported operation object may include the following two types:

First type: a slide by using a finger.

Figure 20:
FIG. 20 is a schematic diagram of another application scene of a method of adjusting a viewable area of a to-be-teleported operation object on an application interface according to an embodiment of the present disclosure.
Figure 21:
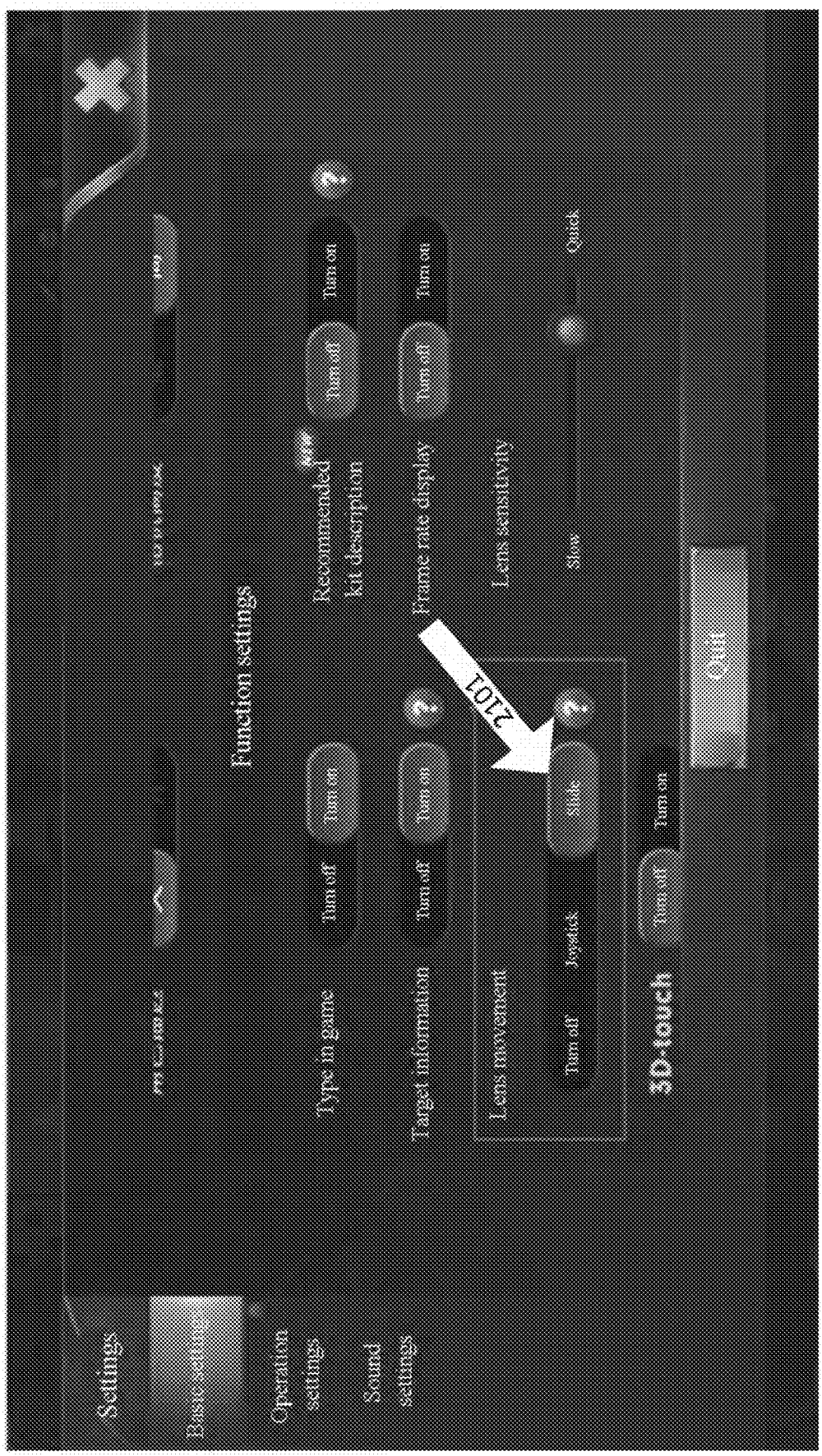
FIG. 21 is a schematic diagram of another application scene of a method of adjusting a viewable area of a to-be-teleported operation object on an application interface according to an embodiment of the present disclosure.
Figure 22:
FIG. 22 is a schematic diagram of another application scene of a method of adjusting a viewable area of a to-be-teleported operation object on an application interface according to an embodiment of the present disclosure.

First, as shown in FIG. 20, "settings" 2001 in an upper right corner is clicked, and a settings interface is turned on. As shown in FIG. 21, "slide" 2101 is selected for a movement of a to-be-teleported operation object. In addition, to-be-teleported operation object sensitivity can be selected according to an actual requirement of a player, that is, to-be-teleported operation object sensitivity in a particular range from slow to quick. As shown in FIG. 22, a finger slides in a target area, so that a movement of the to-be-teleported operation object is controlled.

Second type: a slide by using a joystick.

Figure 23:
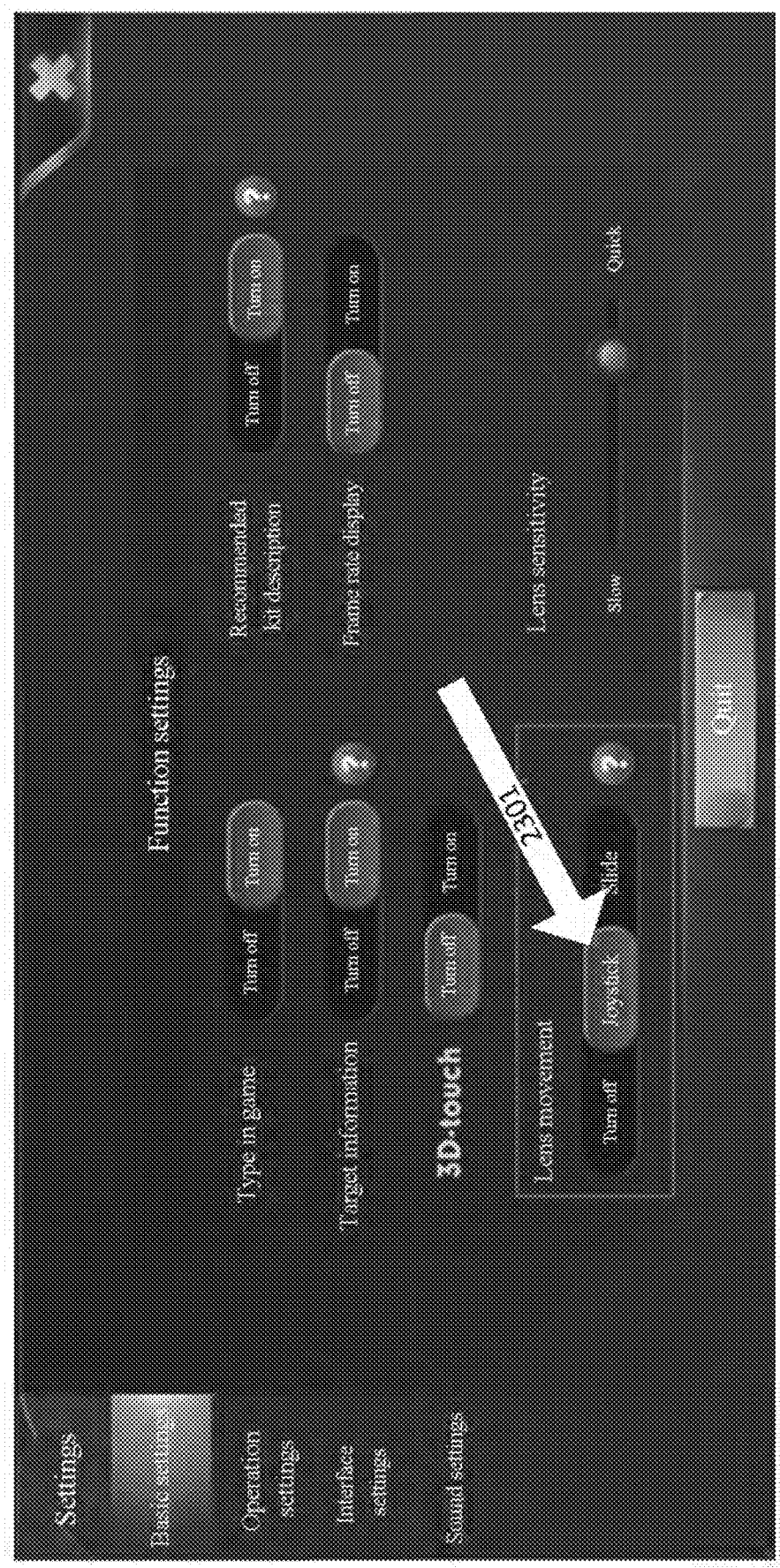
FIG. 23 is a schematic diagram of another application scene of a method of adjusting a viewable area of a to-be-teleported operation object on an application interface according to an embodiment of the present disclosure.
Figure 24:
FIG. 24 is a schematic diagram of another application scene of a method of adjusting a viewable area of a to-be-teleported operation object on an application interface according to an embodiment of the present disclosure.

First, as shown in FIG. 20, "settings" 2001 in an upper right corner is clicked, and a settings interface is turned on. As shown in FIG. 23, "joystick" 2301 is selected for a movement of a to-be-teleported operation object. In addition, to-be-teleported operation object sensitivity can be selected according to an actual requirement of a player, that is, to-be-teleported operation object sensitivity in a particular range from slow to quick. As shown in FIG. 24, a finger clicks in a target area to call out a joystick 2401, so that a movement of the to-be-teleported operation object is controlled by sliding the joystick.

Figure 25:
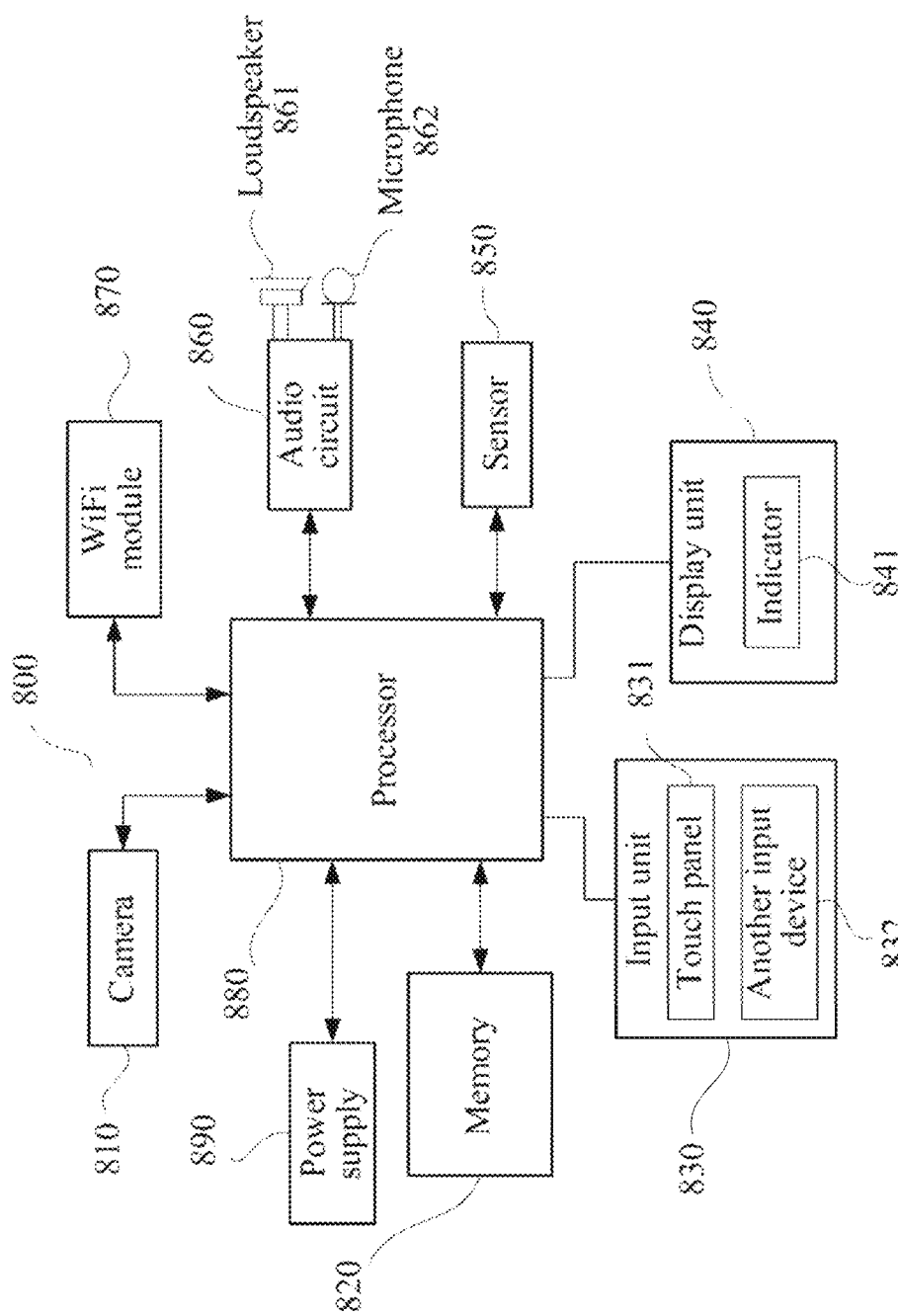
FIG. 25 is a schematic structural diagram of a mobile terminal according to an embodiment of the present disclosure.

This application further provides another mobile terminal, and the mobile terminal may be a mobile phone. As shown in FIG. 25, for ease of description, only parts related to the embodiments of this application are shown. For specific technical details that are not disclosed, refer to the method part in the embodiments of this application.

FIG. 25 is a block diagram of a structure of a part of a mobile terminal 800 according to an embodiment of this application. Referring to FIG. 25, the mobile terminal includes components such as a camera 810, a memory 820, an input unit 830, a display unit 840, a sensor 850, an audio circuit 860, a WiFi module 870, processing circuitry (e.g., a processor 880), and a power supply 890. Persons skilled in the art may understand that, the structure of the mobile terminal shown in FIG. 25 does not constitute a limitation to the mobile terminal, and the mobile terminal may include more components or fewer components than those shown in the figure, or some components may be combined, or a different component deployment may be used.

The following provides specific introduction of components of the mobile terminal with reference to FIG. 25.

The camera 810 may be configured to perform photography.

The memory 820 may be configured to store a software program and module. The processor 880 runs the software program and module stored in the memory 820, to implement various functional applications and data processing of the mobile terminal. The memory 820 may mainly include a program storage area and a data storage area. The program storage area may store an operating system, an application program required by at least one function (such as a sound playback function or an image display function), or the like. The data storage area may store data (such as audio data or an address book) created according to use of the mobile terminal, or the like. In addition, the memory 820 may include a high speed random access memory, and may further include a non-volatile memory, such as at least one magnetic disk storage device, a flash memory, or other volatile solid-state storage devices.

The input unit 830 may be configured to receive an operation instruction of a player, for example, input a scan instruction, and generate an input of key signal related to a player set of the mobile terminal 800 and function control. Specifically, the input unit 830 may include a touch panel 831 and another input device 832. The touch panel 831, which may also be referred to as a touch screen, may collect a touch operation of a player on or near the touch panel (such as an operation of a player on or near the touch panel 831 by using any suitable object or accessory such as a finger or a stylus), and drive a corresponding connection mobile terminal according to a preset program. Optionally, the touch panel 831 may include two parts: a touch detection mobile terminal and a touch controller. The touch detection mobile terminal detects a touch position of the user, detects a signal generated by the touch operation, and transfers the signal to the touch controller. The touch controller receives the touch information from the touch detection mobile terminal, converts the touch information into touch point a coordinate, sends the touch point a coordinate to the processor 880, and can receive a command sent by the processor 880 for execution. In addition, the touch panel 831 may be a resistive, capacitive, infrared, or surface sound wave type touch panel. In addition to the touch panel 831, the input unit 830 may further include another input device 832. Specifically, another input device 832 may include, but is not limited to: one or more of a physical keyboard, a functional key (such as a volume control key or a switch key), a track ball, a mouse, and a joystick.

The display unit 840 may be configured to display an application interface. The display unit 840 may include an indicator 841. Optionally, the indicator 841 may be configured by using a liquid crystal display (LCD), an organic light-emitting diode (OLED), or the like. Further, the touch panel 831 may cover the indicator 841. After detecting a touch operation on or near the touch panel 831, the touch panel 831 transfers the touch operation to the processor 880, to determine a type of the touch event. Then, the processor 880 provides corresponding visual output on the indicator 841 according to the type of the touch event. Although, in FIG. 10, the touch panel 831 and the indicator 841 are used as two separate parts to implement input and output functions of the mobile terminal, in some embodiments, the touch panel 831 and the indicator 841 may be integrated to implement the input and output functions of the mobile terminal.

The mobile terminal 800 further may include at least one type of sensor 850.

The audio circuit 860, a loudspeaker 861, and a microphone 862 may provide audio interfaces between the player and the mobile terminal. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 180 sends the audio data to, for example, another mobile terminal by using the camera 810, or outputs the audio data to the memory 820 for further processing.

The WiFi module 870 may be configured to perform communication.

The processor 880 is the control center of the mobile terminal, and is connected to various parts of the mobile terminal by using various interfaces and lines. By running or executing the software program and/or module stored in the memory 820, and invoking data stored in the memory 820, the processor 180 performs various functions and data processing of the mobile terminal, thereby performing overall monitoring on the mobile terminal. Optionally, the processor 880 may include one or more processing units. Preferably, the processor 880 may integrate an application processor and a modem processor. The application processor mainly processes an operating system, a player interface, an application program, and the like. The modem processor mainly processes wireless communication. It may be understood that the foregoing modem processor may alternatively not be integrated into the processor 880.

The mobile terminal 800 further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown in the figure, the mobile terminal 800 may further include a radio frequency (RF) circuit, a Bluetooth module, or the like, which are not further described herein.

In this embodiment of the present disclosure, the processor 880 included in the mobile terminal further has the following functions:

receiving a scene switching instruction by using an application interface, the application interface displaying a first scene, and a to-be-teleported operation object being located in the first scene;

switching the first scene displaying on the application interface to a second scene according to the scene switching instruction, the second scene being provided with a teleportation location object;

responding to a touch operation on the teleportation location object in the second scene to trigger a teleportation instruction; and performing a process in which a coordinate of the to-be-teleported operation object is updated to a coordinate of the teleportation location object in the second scene according to the teleportation instruction.

Descriptions of parts of FIG. 1 to FIG. 24 may be referred to for understanding of the mobile terminal according to the embodiment shown in FIG. 25, which are not repeatedly described herein again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be or may not be physical units, that is, may be located in one position, or may be distributed on a plurality of network unit. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended to describe the technical solutions of the present disclosure, but not to limit the present disclosure. Although the present disclosure is described in detail with reference to the foregoing embodiments, persons of ordinary skill in the an should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method, comprising:

receiving, by processing circuitry of an information processing apparatus, a scene switching instruction via an application interface, the application interface displaying a first scene including a to-be-teleported operation object;

switching, by the processing circuitry of the information processing apparatus, the first scene displayed on the application interface to a second scene according to the scene switching instruction, the second scene including one or more target teleportation objects to which other objects may teleport;

receiving, by the processing circuitry of the information processing apparatus, a touch operation performed in the second scene; and in response to receiving the touch operation, performing, by the processing circuitry of the information processing apparatus, a process of updating a coordinate of the to-be-teleported operation object to transfer the to-be-teleported operation object to a location of a selected target teleportation object among the one or more target teleportation objects in the second scene, wherein the selected target teleportation object is a closest one to the received touch operation among the one or more target teleportation objects in the second scene.

2. The method according to claim 1, further comprising: receiving the scene switching instruction via a map on the application interface.

3. The method according to claim 1, further comprising:

sending synchronization data to a server, to enable the server to perform a check according to the synchronization data; and receiving a confirmation from the server, the confirmation indicating that the check performed by the server on the synchronization data is passed.

4. The method according to claim 1, wherein a type of the selected target teleportation object is one of a fixed teleportation object type or a movable teleportation object type, and the fixed teleportation object type is indicated as a teleportation object in the second scene.

5. The method according to claim 4, further comprising:
when the selected target teleportation object in the second scene is of the movable teleportation object type, adding a protection attribute to the selected target teleportation object to prevent a state of the selected target teleportation object from being changed during the process of updating the coordinate of the to-be-teleported operation object, the protection attribute including an immovable state, an attack disabled state, or an invisible state.

6. The method according to claim 1, further comprising:
when the to-be-teleported operation object is under attack, becomes dead, or moves in the first scene during the process of updating the coordinate of the to-be-teleported operation object, stopping the process of updating the coordinate of the to-be-teleported operation object.

7. The method according to claim 1, further comprising:
determining whether a teleportation function is available for the to-be-teleported operation object.

8. The method according to claim 1, wherein
the receiving the scene switching instruction via the application interface comprises receiving a first instruction of switching a position of the to-be-teleported operation object via the application interface,
the switching the first scene displayed on the application interface to the second scene according to the scene switching instruction comprises switching the first scene on the application interface to a position switching map according to the first instruction, the position switching map comprising one or more candidate positions,
the receiving the touch operation performed in the second scene comprises receiving a second instruction corresponding to the touch operation on the one or more candidate positions on the displayed position switching map and determining one of the one or more candidate positions to be the selected target teleportation object, and
the performing the process of updating the coordinate of the to-be-teleported operation object comprises switching the to-be-teleported operation object to a target position.

9. The method according to claim 8, wherein the one or more candidate positions each comprises:
a coordinate position of a resource object that may be used by the to-be-teleported operation object, wherein the resource object has a same preset attribute as the to-be-teleported operation object.

10. The method according to claim 9, wherein the switching the first scene on the application interface to the position switching map according to the first instruction comprises:
obtaining the coordinate position of the resource object;
displaying the position switching map on the application interface; and
displaying an icon of the resource object at the coordinate position of the resource object on the position switching map.

11. The method according to claim 8, further comprising:
determining a touch effective range of the second instruction corresponding to the touch operation; and
determining a candidate position of the one or more candidate positions in the touch effective range of the second instruction as the target position.

12. The method according to claim 8, further comprising:
determining whether the to-be-teleported operation object satisfies a preset condition for switching the position of the to-be-teleported operation object after receiving the first instruction via the application interface; and
when the to-be-teleported operation object satisfies the preset condition, displaying the position switching map on the application interface.

13. A non-transitory computer-readable medium storing a program executable by a processor to perform the method according to claim 1.

14. An apparatus, comprising:
circuitry configured to
receive a scene switching instruction via an application interface, the application interface being configured to display a first scene including a to-be-teleported operation object;
switch the first scene displayed on the application interface to a second scene according to the scene switching instruction, the second scene including one or more target teleportation objects to which other objects may teleport;
receive a touch operation performed in the second scene; and
in response to receiving the touch operation, perform a process of updating a coordinate of the to-be-teleported operation object to transfer the to-be-teleported operation object to a location of a selected target teleportation object among the one or more target teleportation objects in the second scene,
wherein the selected target teleportation object is a closest one to the received touch operation among the one or more target teleportation objects in the second scene.

15. The apparatus according to claim 14, wherein the circuitry is further configured to:
receive the scene switching instruction via a map on the application interface.

16. A method, comprising:
receiving, by processing circuitry of an information processing apparatus, a first instruction of switching a position of a to-be-teleported operation object in a first scene via an application interface;
displaying, by the processing circuitry of the information processing apparatus, a position switching map in response to receiving the first instruction, the position switching map including one or more candidate positions each corresponding to an icon of a target teleportation object;
receiving, by the processing circuitry of the information processing apparatus, a second instruction corresponding to a touch operation performed on the position switching map; and
in response to receiving the second instruction, transferring, by the processing circuitry of the information processing apparatus, the to-be-teleported operation object in the first scene to a location in a second scene, the location in the second scene being a location of a selected target teleportation object corresponding to one of the one or more candidate positions on the position switching map to which the touch operation corresponding to the second instruction was closest.

17. The method according to claim 16, wherein the transferring the to-be-teleported operation object in the first scene to the location in the second scene is performed directly in response to receiving the second instruction.

18. A non-transitory computer-readable medium storing a program executable by a processor to perform the method according to claim 16.

* * * * *